(12) United States Patent
Alard

(10) Patent No.: US 6,584,068 B1
(45) Date of Patent: Jun. 24, 2003

(54) PROTOTYPE SIGNALS CONSTRUCTION FOR MULTICARRIER TRANSMISSION

(75) Inventor: Michel Alard, Paris (FR)

(73) Assignee: France Telecom, Paris (FR)

(*) Notice: Subject to any disclaimer, the term of this patent is extended or adjusted under 35 U.S.C. 154(b) by 0 days.

(21) Appl. No.: 09/297,787
(22) PCT Filed: Nov. 7, 1997
(86) PCT No.: PCT/FR97/02013
§ 371 (c)(1), (2), (4) Date: Aug. 23, 1999
(87) PCT Pub. No.: WO98/21861
PCT Pub. Date: May 22, 1998

(30) Foreign Application Priority Data

Nov. 8, 1996 (FR) .............................. 96 13917

(51) Int. Cl.⁷ ................................. H04J 11/00
(52) U.S. Cl. ................... 370/208; 370/343; 375/346
(58) Field of Search ..................... 370/203, 204, 370/208, 210, 343; 375/346, 347, 348, 349

(56) References Cited

U.S. PATENT DOCUMENTS 5,790,516 A * 8/1998 Gudmundson et al. ..... 370/210
6,278,686 B1 * 8/2001 Alard ...................... 370/204

FOREIGN PATENT DOCUMENTS

FR WO 96 35278 A 11/1996
WO WO 01/35555 * 5/2001

OTHER PUBLICATIONS

Daubechies, "The Wavelet Transform, Time–Frequency Localization and Signal Analysis", Sep. 5, 1990, pp. 961–1005.
Bultan, "A Four–Parameter Atomic Decomposition of Chirplets", Apr. 21, 1997, pp. 3625–3628.
Alieva, "On the Self–Fractional Fourier Functions", Aug. 7, 1996, vol. 29, No. 15, pp. L377–L379.
Bastiaans, "On Optimum Oversampling in the Gabor scheme", Apr. 21, 1997, pp. 2101–2104.
Xiang–Gen Xia et al., "Generalized–marginal Time–frequency Distributions", Jun. 18, 1996, pp. 509–512.

* cited by examiner

Primary Examiner—Ajit Patel
(74) Attorney, Agent, or Firm—Kinney & Lange, P.A.

(57) ABSTRACT

This invention concerns a multicarrier signal designed to be transmitted to digital receivers, especially in a non-stationary transmission channel. The multicarrier signal corresponds to the frequency multiplexing of several elementary carriers. Each of the several elementary carriers corresponds to a series of symbols. The multicarrier signal is built on a non-orthogonal time-frequency lattice with a density two.

15 Claims, 10 Drawing Sheets

PROTOTYPE SIGNALS CONSTRUCTION FOR MULTICARRIER TRANSMISSION

1. FIELD OF THE INVENTION

1.1 General Field

The field of the invention is that of the transmission or broadcasting of digital data, or of analog and sampled data, designed to be received in particular by moving bodies. More specifically, the invention relates to signals produced by means of new forms of modulation as well as to the corresponding techniques of modulation and demodulation.

For many years now, it has been sought to build modulation schemes adapted to highly non-stationary channels, such as channels for transmission towards moving bodies. In such channels, the signal sent out is affected by phenomena of fading and multiple paths. The work carried out by the CCETT within the framework of the European project EUREKA 147 (DAB: Digital Audio Broadcasting) has shown the value, for channels of this type, of multicarrier modulation and especially of OFDM (Orthogonal Frequency Division Multiplexing).

OFDM has been chosen within the framework of this European project as the basis of the DAB standard. This technique can also be chosen as a modulation technique for digital video broadcasting (DVB). However, a certain number of limitations (specified hereinafter) are observed when dealing with the problem of modulation encoded with high spectral efficiency such as the modulation required for digital television applications.

1.2 Possible Applications

The invention can be applied in many fields, especially when high spectral efficiency is desired and when the channel is highly non-stationary.

A first category of applications relates to terrestrial digital radio-broadcasting, whether of images, sound and/or data. In particular, the invention can be applied to synchronous broadcasting which intrinsically generates long-term multiple paths. It can also advantageously be applied to broadcasting toward moving bodies.

Another category of applications relates to digital radio-communications. The invention can be applied especially in systems of digital communications with moving bodies at high bit rates, in the framework for example of the UMTS. It can also be envisaged for high bit rate local radio networks (of the HIPERLAN type).

A third category of applications is that of underwater transmission. The transmission channel in underwater acoustics is highly disturbed because of the low speed of transmission of acoustic waves in water. This leads to a major spread of the multiple paths and of the Doppler spectrum. The techniques of multicarrier modulation, and especially the techniques that are an object of the present invention, are therefore well suited to this field.

2. PRIOR ART

2.1 Theoretical Observations on the Representation of the Signals

Before presenting the signals according to the invention, a description is given here below of the known signals. This description is based on a general approach to multicarrier signals, defined by the inventors, that is novel per se. This general approach has indeed no equivalent in the prior art and is no way obvious to those skilled in the art. It must therefore be considered to be a part of the invention and not as forming part of the prior art.

The signals of interest are real signals (an electrical magnitude for example), that have finite energy and are a function of time. The signals may therefore be represented by real functions of $L^2(R)$. Furthermore, these signals are limited band signals and their spectrum is contained in $$\left[f_c - \frac{w}{2}, f_c + \frac{w}{2}\right],$$

$f_c$ being the "carrier frequency" of the signal. It is therefore possible, in an equivalent manner, to represent a real signal a(t) by its complex envelope s(t) with:

$$s(t) = e^{-i\pi f_c t} F_A[a](t) \tag{1}$$

where $F_A$ designates the analytical filter.

The signal s(t) belongs to a vector subspace $$\left(\text{characterized by the limitation of the band to } \pm \frac{w}{2}\right)$$

of the space of the complex functions of a real variable with a summable square $L^2(R)$. This vector space can be defined in two different ways, depending on whether the building is done on the field of the complex values or on the field of the real values. With each of these spaces, it is possible to associate a scalar product with a value in C or in R and to build a Hilbert space. H designates the Hilbert space built on the field of the complex values and $H_R$ designates the Hilbert space built on the field of the real values.

The corresponding scalar values are written as follows:

$$\langle x | y \rangle = \int_R x(t) y^+(t) dt \text{ in the case of } H \tag{2}$$

and $$\langle x | y \rangle_R = \mathcal{R}e \int_R x(t) y^+(t) dt \text{ in the case of } H_R \tag{3}$$

The associated standards are obviously identical in both cases:

$$\|x\| = \left[\int_R |x(t)|^2 dt\right]^{1/2} \tag{4}$$

2.2 General Principles of the OFDM

The general principles of the OFDM are presented for example in the French patent FR-86 09622 filed on Jul. 2nd, 1986. The basic idea of the technique is that of transmitting encoded signals as coefficients of elementary waveforms that are confined as far as possible in the time-frequency plane and for which the transmission channel may be considered to be locally stationary. The channel then appears to be a simple multiplier channel characterized by the distribution of the modulus of the coefficients, which follows a law of Rice or of Rayleigh.

Protection is then provided against fading phenomena by means of a code. This code can be used in weighted decision mode in association with time and frequency interlacing, which ensures that the signals playing a part in the minimum meshing of the code are affected, to the utmost possible extent, by independent fading phenomena.

This technique of encoding with interlacing in the time-frequency plane is known as COFDM. It is described for example in the document [22] (see Appendix 1 (to simplify the reading, most of the prior art references are listed in Appendix 1. This Appendix as well as Appendices 2 and 3 must of course be considered to be integral parts of the present description)).

There are essentially two types of known OFDM modulations. The terms applied in the literature are often ambiguous. Here we introduce new appellations that are more precise while recalling their relation with the existing literature. We shall use the generic name OFDM followed by a suffix specifying the type of modulation within this group.

2.3 OFDM/QAM
2.3.1 Theoretical Principles

A first category of modulation is constituted by a multiplex of QAM (Quadrature Amplitude Modulation) carriers or possibly QPSK (Quadrature Phase Shift Keying) carriers in the particular case of binary data elements. Hereinafter, this system shall be called OFDM/QAM. The carriers are all synchronized and the carrier frequencies are spaced out in reverse to the symbol time. Although the spectra of these carriers overlap, the synchronization of the system makes it possible to ensure orthogonality between the symbols sent out by the different carriers.

The references [1] to [7] give a good idea of the literature available on this subject.

For greater simplicity in the writing, and according to the novel approach of the invention, the signals will be represented by their complex envelope described here above. Under these conditions, the general equation of an OFDM/QAM signal is written as follows:

$$s(t) = \sum_{m,n} a_{m,n} x_{m,n}(t) \tag{5}$$

The coefficients $a_{m,n}$ take complex values representing the data sent. The functions $x_{m,n}(t)$ are translated into the time-frequency space of one and the same prototype function $x(t)$:

$$x(t) = \begin{cases} \dfrac{1}{\sqrt{\tau_0}} & si |t| \leq \tau_0/2 \\ 0 & \text{elsewhere} \end{cases} \tag{6}$$

$$x_{m,n}(t) = e^{2i\pi m v_0^0 t} x(t - n\tau_0) \text{ with } v_0 \tau_0 = 1 \tag{7}$$

$\phi$ being any phase that can be arbitrarily set at 0. The function $x(t)$ is centered, namely its first order moments are zero, giving:

$$\int t|x(t)|^2 dt = \int f|X(f)|^2 df = 0, \tag{8}$$

$X(f)$ designating the Fourier transform of $x(t)$.

Under these conditions, it is observed that:

$$\int t\|x_{m,n}(t)\|^2 dt = n\tau_0$$

$$\int t\|X_{m,n}(f)\|^2 dt = nv_0 \tag{9}$$

The barycenters of the basic functions therefore form a lattice of the time-frequency plane generated by the vectors $(\tau_0, 0)$ and $(0, v_0)$, as shown in FIG. 1. This lattice has a density of one, namely $v_0 \tau_0 = 1$. Reference may be made to the article [9] for a more detailed discussion on this subject.

The prototype function $x(t)$ has the special characteristic wherein the functions $\{x_{m,n}\}$ are mutually orthogonal and more specifically constitute a Hilbert base of $L^2(R)$, giving:

$$\langle x_{m,n} | x_{m',n'} \rangle = \begin{cases} 1 & \text{if } (m,n) = (m',n') \\ 0 & \text{if not} \end{cases} \tag{10}$$

Projecting a signal on this basis is equivalent simply to breaking down the signal into sequences with a duration of $\tau_0$ and representing each of these sequences by the corresponding Fourier series development. This type of breakdown is a first step towards a localization both in time and in frequency as opposed to the standard Fourier analysis which provides for perfect frequency localization with a total loss of temporal information.

Unfortunately, while the temporal localization is excellent, the frequency localization is far less efficient owing to the slow decreasing function of $X(f)$. The Balian-Low-Coifman-Semmes theorem (see [9], p. 976) furthermore shows that if X designates the Fourier transform of x, then $tx(t)$ and $fX(f)$ cannot simultaneously be summable squares.

2.3.2 The OFDM/OAM with Guard Interval

Generally, the tolerance of an OFDM modulation with respect to multiple paths and Doppler spreading can be characterized by a parameter that comprehensively measures the variation of the level of inter-symbol interference (ISI) as a function of a temporal or frequency shift. The justification of this concept is given in Appendix 2. This tolerance parameter is called $\xi$ and is defined by the relationship:

$$\xi = 1/4\pi \Delta t \Delta f \tag{11}$$

with:

$$\Delta t^2 \int |x(t)|^2 dt = \int t|x(t)|^2 dt \tag{12}$$

$$\Delta f^2 \int |X(f)|^2 dt = \int f|X(f)|^2 dt \tag{13}$$

By virtue of Heisenberg's inequality, $\xi$ cannot exceed unity.

Given the Balian-Low-Coifman-Semmes theorem referred to here above, the parameter $\xi$ is equal to 0 for the OFDM/QAM. This is a major defect of the OFDM/QAM modulation as described here above. This is characterized in practice by high sensitivity to temporal errors and consequently multiple paths.

This defect can be circumvented by the use of a guard interval described for example in [5]. This is a device consisting in extending the rectangular window of the prototype function. The density of the lattice of base symbols is then strictly smaller than unity.

This technique is possible because an infinity of translated versions of the initial symbol is found within a symbol extended by a guard interval. Of course, this works only because the prototype function is a rectangular window. In this sense, the OFDM/QAM with a guard interval is a unique and singular point.

OFDM/QAM modulation with guard interval is the basis of the DAB system. This guard interval makes it possible to limit inter-symbol interference at the cost of a loss of performance since a part of the information transmitted is not really used by the receiver but is used only to absorb the multiple paths.

Thus, in the case of the DAB system, where the guard interval represents 25% of the useful symbol, the loss is 1 dB. Furthermore, there is an additional loss due to the fact that to obtain a given comprehensive spectral efficiency, it is necessary to compensate for the loss due to the guard interval by a greater efficiency of the code used.

This loss is marginal in the case of the DAB system because the spectral efficiency is low. On the contrary, if it is sought to obtain an overall spectral efficiency of 4 bits/Hz, it is necessary to use a 5 bit/Hz code giving, according to the Shannon theorem, a loss of the order of 3 dB. The total loss is therefore in this case about 4 dB.

2.3.3 Other OFDM/QAM Systems

It is possible to conceive of other systems of the OFDM/QAM type. Unfortunately, no filtered QAM modulation, namely one using a conventional half-Nyquist (or more specifically "Nyquist square root") type of shaping verifies the requisite constraints of orthogonality. The known prototype functions verifying the requisite criteria of orthogonality are:

the rectangular window;
the cardinal sine.

These two examples are trivial and appear to be dual with respect to each other by the Fourier transform. The case of the rectangular window corresponds to the OFDM/QAM without guard interval. The case of the cardinal sine corresponds to a standard frequency multiplex (namely one where the carriers have disjoint spectra) with a 0% roll-off which is an asymptotic case that is difficult to achieve in practice.

In each of these cases, it is observed that the prototype function is perfectly limited either in time or in frequency but has a mediocre decrease (in 1/t or 1/f) in the dual domain.

The Balian-Low-Coifman-Semmes theorem furthermore leaves little hope that there might exist satisfactory solutions. As indicated here above, this theorem shows that $tx(t)$ and $fX(f)$ cannot simultaneously have a summable square. They can therefore be no hope of finding a function $x(t)$ such that $x(t)$ and $X(f)$ decrease simultaneously with an exponent smaller than $-3/2$.

This furthermore does not rule out the possibility that there exist functions that are satisfactory from the viewpoint of an engineer. However, a recent article [10] dealing with this subject shows another exemplary prototype function having the requisite properties. The shape of the prototype function proposed in this article is very far from what may be hoped for in terms of temporal concentration. It is therefore probable that there is no satisfactory OFDM/QAM type solution.

In conclusion, the OFDM/QAM approach corresponding to the use of a lattice with a density 1 and complex coefficients $a_{m,n}$ can be put into practice only in the case of a rectangular temporal window and in the case of the use of a guard interval. Those skilled in the art seeking other modulations will therefore have to turn towards the techniques described here below under the designation of OFDM/OQAM.

2.4 OFDM/OQAM

A second category of modulations uses a multiplex of OQAM (Offset Quadrature Amplitude Modulation) modulated carriers. Hereinafter, this system shall be called OFDM/OQAM. The carriers are all synchronized and the carrier frequencies are spaced out by half of the reverse of the symbol time. Although the spectra of these carriers overlap, the synchronization of the system and the choices of the phases of the carriers can be used to guarantee the orthogonality between the symbols put out by the different carriers. The references [11–18] give a clear picture of the literature available on this subject.

For greater simplicity in the writing, the signals are represented in their analytical form. Under these conditions, the general equation of an OFDM/OQAM signal can be written as follows:

$$s(t) = \sum_{m,n} a_{m,n} x_{m,n}(t) \qquad (14)$$

The coefficients $a_{m,n}$ assume real values representing the data elements transmitted. The functions $x_{m,n}(t)$ are translated in the time-frequency space of one and the same prototype function $x(t)$:

$$\begin{cases} x_{m,n}(t) = e^{i(2\pi m v_0 t + \varphi)} x(t - n\tau_0) & \text{if } m+n \text{ est pair is even} \\ x_{m,n}(t) = i e^{i(2\pi m v_0 t + \varphi)} x(t - n\tau_0) & \text{if } m+n \text{ is odd} \end{cases} \qquad (15)$$

with $v_0 \tau_0 = 1/2$.

$\phi$ being any phase that can be arbitrarily set at 0.

The barycenters of the basic functions therefore form a lattice of the time-frequency plane generated by the vectors $(\tau_0, 0)$ and $(0, v_0)$, as shown in FIG. 2.

This lattice has a density 2. The functions $x_{m,n}(t)$ are mutually orthogonal in the sense of the scalar product in R. In the known approaches, the prototype function is limited in frequency in such a way that the spectrum of each carrier overlaps only that of the adjacent carriers. In practice, the prototype functions considered are even-parity functions (real or possibly complex) verifying the following relationship:

$$\begin{cases} X(f) = 0 & \text{if } |f| \geq v_0 \\ |X(f)|^2 + |X(f - v_0)|^2 = 1/v_0 & \text{if } 0 \leq f \leq v_0 \end{cases} \qquad (16)$$

A possible choice for $x(t)$ is the pulse response of a half-Nyquist filter with 100% roll-off, namely:

$$X(f) = \begin{cases} \dfrac{1}{\sqrt{v_0}} \cos \pi f \tau_0 & \text{if } |f| \leq v_0 \\ 0 & \text{elsewhere} \end{cases} \qquad (17)$$

When $x(t)$ and its Fourier transform are observed, it is noted that $X(f)$ has a bounded support and that $x(t)$ decreases in $t^{-2}$, i.e. this is a result substantially better than the theoretical limit resulting from the Balian-Low-Coifman-Semmes theorem. The elementary waveforms are better localized in the time-frequency plane than in the case of the OFDM/QAM, which gives this modulation a better behavior in the presence of multiple paths and of Doppler phenomena. As above, it is possible to define the parameter $\xi$ measuring the tolerance of the modulation to the delay and to the Doppler phenomenon. This parameter $\xi$ is equal to 0.865.

2.5 OFDM/MSK

Another approach, described in the French patent application FR-95 05455 filed on May 2, 1995 (as yet unpublished) on behalf of the Applicants filing the present Application, consists in using a different prototype function.

This prototype function x(t) is an even-parity function, zero outside the interval $[-\tau_0, \tau_0]$, and verifies the relationship:

$$\begin{cases} x(t) = 0 & \text{if } |t| \geq \tau_0 \\ |x(t)|^2 = |x(t-\tau_0)|^2 = 1/\tau_0 & \text{if } 0 \leq t < \tau_0 \end{cases}$$

Advantageously, said prototype function x(t) is defined by:

$$x(t) = \begin{cases} \dfrac{1}{\sqrt{\tau_0}} \cos \pi t/2\tau_0 & \text{if } |t| \leq \tau_0 \\ 0 & \text{elsewhere} \end{cases}$$

This function may be considered to be dual by Fourier transform of the prototype function used in the case of the OFDM/OQAM. This particular case is called OFDM/MSK. The performance characteristics in terms of resistance to Doppler phenomena and multiple paths are equivalent to the OFDM/OQAM, and the making of the receiver is simplified.

2.6. OFDM/IOTA

Another approach, also described in the patent application FR-95 05455 referred to here above, consists of the use of a prototype function that is limited neither in time nor in frequency, but possesses properties of fast decreasing in the temporal as well as frequency domains. This prototype function x(t) is characterized by the equation:

$$x(t) = \frac{y(t)}{\sqrt{\tau_0 \sum_k |y(t - k\tau_0)|^2}}$$

the function y(t) being defined by its Fourier transform Y(f):

$$Y(f) = \frac{G(f)}{\sqrt{v_0 \sum_k |G(f - kv_0)|^2}}$$

where G(f) is a normalized Gaussian function of the type: $G(f) = (2\alpha)^{1/4} e^{-\pi \alpha f^2}$. In the case of the OFDM/IOTA modulation, the parameter a is set at 1. In this case, the corresponding prototype function, referenced $\Im$, is identical to its Fourier transform.

The making of the receiver is simpler than in the case of the OFDM/OQAM, although it is slightly more complex than in the preceding case, but the performance is substantially superior.

3. DRAWBACKS OF THE PRIOR ART SYSTEMS

These prior art systems have many drawbacks and limits, especially in very disturbed channels and when high efficiency is required.

3.1 OFDM/QAM

The main problem of the OFDM/QAM system is that it imperatively requires the use of a guard interval. As indicated here above, this gives rise to a substantial loss of efficiency when high spectral efficiency values are aimed at.

Furthermore, the signals sent out are poorly concentrated in the frequency domain, which also limits the performance characteristics in the highly non-stationary channels. In particular, this spread makes it difficult to use equalizers.

3.2 OFDM/OQAM

Conversely, the frequency performance characteristics of the OFDM/OQAM are rather satisfactory and the problem of the loss related to the guard interval does not arise. By contrast, the pulse response of the prototype function has a relatively slow temporal decrease, namely a decrease in $1/x^2$.

This implies two types of difficulties. First of all, it may be difficult to truncate the waveform in a short interval of time. This implies complex processing in the receiver. Furthermore, this also implies possible systems of equalization.

In other words, the efficiency of the OFDM/OQAM techniques is greater than that of the OFDM/QAM techniques, but these techniques prove to be more complicated to implement and therefore costly, especially in receivers.

3.3 OFDM/MSK

OFDM/MSK modulation has performance characteristics in terms of resistance to Doppler phenomena and multiple paths in relation to the OFDM/OQAM. These performance characteristics are below those of the OFDM/IOTA. By contrast, the temporal function of the prototype function simplifies the receiver.

3.4 OFDM/IOTA

OFDM/IOTA modulation has optimum performance characteristics in terms of resistance to Doppler phenomena and multiple paths. By contrast, the making of the receiver is more complex than in the case of the OFDM/MSK.

4. PRESENTATION OF THE INVENTION

4.1 Goals of the Invention

It is a goal of the invention in particular to overcome these different drawbacks and limitations of the prior art.

Thus, a goal of the invention is to provide a digital signal designed to be transmitted or broadcast to receivers, that can be used to obtain performance characteristics equivalent to those of the best known solution, namely the OFDM/IOTA solution, while at the same time improving the temporal response concentration, in particular so as to simplify the processing at the receiver.

The invention is also aimed at providing a signal of this kind enabling the making of receivers with limited complexity and cost, especially as regards demodulation and equalization.

An additional goal of the invention is to provide transmitters, receivers, methods of transmission or broadcasting, methods of reception and methods for the building, namely the definition, of a modulation corresponding to such a signal.

4.2 Main Characteristics of the Invention

These aims as well as others that shall appear hereinafter are achieved according to the invention by a multicarrier signal designed to be transmitted to digital receivers, especially in a non-stationary transmission channel, corresponding to the frequency multiplexing of several elementary carriers each corresponding to a series of symbols, built on a non-orthogonal time-frequency lattice with a density 2.

Advantageously, this lattice is a quincunxial lattice in which, the spacing between two neighboring carriers being equal to $v_0$, the symbol time $\tau_0$ is equal to a quarter of the inverse of the spacing $v_0$ between two neighboring carriers, the symbols sent out on one and the same carrier are spaced out by two symbol times $\tau_0$.

the symbols sent out on adjacent carriers are offset by the symbol time $\tau_0$.

Preferably, each carrier undergoes a filtering operation for the shaping of its spectrum.

This filtering is chosen so that each symbol element is concentrated as far as possible both in the temporal field and the frequency field.

In particular, a signal of this kind may meet the following equation:

$$s(t) = \sum_{m+n \text{ even}} a_{m,n} x_{m,n}(t)$$

where:

$a_{m,n}$ is a real coefficient representing the signal source chosen in a predetermined alphabet of modulation;

m is an integer representing the frequency dimension;

n is an integer representing the temporal dimension;

t represents time;

$x_{m,n}(t)$ is a basic function translated into the time-frequency space of one and the same even-parity prototype function x(t) taking real or complex values, namely:

$$x_{m,n}(t) = e^{i\phi_{m,n}} e^{i(2\pi m v_0 t + \phi)} x(t - n\tau_0) \text{ with } v_0 \tau_0 = 1/2$$

with $\phi_{m,n} = (m+n+mn+(n^2-m^2)/2)\pi/2$ where $\phi$ is an arbitrary phase parameter, and where said basic functions $\{x_{m,n}\}$ are mutually orthogonal, the real part of the scalar product of two different basic functions being zero.

Thus, the invention is based on a system of modulation using prototype functions that are as concentrated as possible in the time-frequency plane. The value of this approach is that it makes available a modulation having performance characteristics identical to those of the OFDM/IOTA modulation while at the same time providing the benefit of a faster decrease pulse response.

In other words, an object of the invention relates to novel systems of modulation built, like the OFDM/IOTA modulation, on a lattice with a density 2. The essential difference with respect to systems that are already known is that the basic lattice is a quincunxial lattice with a density of 1/2.

Among the types of modulation proposed, there are modulations using prototype functions that are bounded neither in time nor in frequency but, on the contrary, have properties of fast decrease both in time and in frequency and an almost optimum concentration in the time-frequency plane.

Signals of this kind are in no way obvious to those skilled in the art, in view of the prior art. As indicated here above, there are basically two modes of building OFDM type modulations.

The first known building mode uses an orthogonal lattice with a density 1. This first approach uses a base for the breakdown of the signals where every signal is subdivided into intervals, each interval being then broken down in the form of Fourier series. This is the OFDM/QAM approach. The literature gives few examples of alternative approaches built on the same lattice, and the results obtained are of little practical interest [10].

Furthermore, the OFDM/QAM technique is the only one that can benefit from the method of the guard interval. The OFDM/QAM approach is therefore a singular feature that permits no extension.

The second known building mode uses an orthogonal lattice with the density 2. It combines a set of modulations such as the OFDM/OQAM, OFDM/MSK and OFDM/IOTA modulations. These modulations differ in the choice of the prototype function which is either frequency-bounded (OFDM/OQAM) or time-bounded (OFDM/MSK) or is bounded neither in time nor in frequency but has properties of fast decrease in both dimensions (OFDM/IOTA).

Consequently, it is not a simple matter to build new types of modulation that are not built on such orthogonal lattices.

All the variants of the invention described here below have the advantage of using a fast decrease prototype function in such a way that the function can be easily truncated.

The basic principle consists in building a prototype function that has the desired properties of orthogonality on a quincunxial type of lattice. The building method, which is described in detail in appendix 2, consists in effecting a 45° rotation in the time-frequency plane on the basis of a prototype function having the desired properties of orthogonality on an orthogonal lattice. The operator that enables this rotation is not a classical operator. It may be likened to the square root of a Fourier transform and is denoted $F^{1/2}$. The mathematical justification of this notation is given in appendix 3.

In principle, the method may be applied to any prototype function that enables the building of a Hilbert base on an orthogonal lattice with a density 1/2. On this basis, the prototype functions of the OFDM/OQA/ and of the OFDM/MSK are usable. They lead however to results that are complex functions. Consequently, the results obtained are of little practical value.

Let us consider the conditions needed for this building method to lead to a real function. Let us take an even-parity real prototype function x(t) enabling the generation of a Hilbert base on an orthogonal lattice with a density 2, and the function y(t) defined by:

$$y = F^{1/2} x$$

where $F^{1/2}$ is the square root operator of the Fourier transform as defined here above. At the level of the ambiguity functions (as defined in appendix 2), this operator carries out a rotation by an angle $-\pi/4$ in the time-frequency plane. In order that the function y(t) may be an even-parity real function, its ambiguity function should have a symmetry with respect to the time and frequency axes. This therefore means that the function x(t), in addition to the symmetry with respect to the time and frequency axes, has a symmetry with respect to the diagonals of the time-frequency plane. Such a property can be verified only if the function x(t) is identical to its Fourier transform. Now, at present, we know only one function having this property. This is the prototype function of the OFDM/IOTA, namely $\Im$.

The function IOTA $\pi/4$ is therefore defined by the relationship:

$$\Im^{\pi/4} = F^{1/2} \Im$$

This function is, by construction, a real, even-parity function. The ambiguity function of this function gets cancelled therefore on a quincunxial lattice.

The set of functions $\{\Im_{m,n}^{\pi/4}\}$ defined by:

$$\Im_{m,n}^{\pi/4}(t) = e^{i\phi_{m,n}} e^{i\pi(m-n)t} \Im^{\pi/4}(t-(m+n)/2)$$

with $\phi_{m,n} = (m+n+mn+(n^2-m^2)/2)\pi/2$ constitute a Hilbert base.

In redefining the indices, the definition of this set may be rewritten as follows:

$$\mathfrak{S}_{m,n}^{\pi/4}(t)=e^{i\phi_{m,n}}e^{i\pi mt}\mathfrak{S}^{\pi/4}(t-n/2), \; m+n \text{ even parity}$$

with $\phi_{m,n}=(n-mn/2+(n^2-m^2)/4)\pi/2$

The invention also relates to a method for the transmission of a digital signal especially in a non-stationary transmission channel, comprising the following steps:

the channel encoding of a digital signal to be transmitted, delivering real digital coefficients amen chosen out of a predetermined alphabet;

the building of a signal s(t) meeting the equation defined here above;

the transmission of a signal, having said signal s(t) as its complex envelope, to at least one receiver.

Advantageously, a method of this kind furthermore comprises a step of frequency and/or time interlacing applied to the binary elements forming said digital signal to be transmitted or to the digital coefficients $a_{m,n}$.

This makes it possible to provide for optimal performance characteristics in the non-stationary channels.

The invention also relates to the transmitters of a signal of this kind.

The invention also relates to a method for the reception of a signal as described here above, comprising the following steps:

the reception of a signal having, as its complex envelope, a signal r(t) corresponding to the signal s(t) at transmission;

the estimation of the response of the transmission channel comprising an estimation of the phase response $\theta_{m,n}$ and of the amplitude response $\rho_{m,n}$;

the demodulation of said signal r(t) comprising the following steps:

the multiplication of said signal r(t) by the prototype function x(t);

the aliasing of the filtered waveform modulo $2\tau_0$;

the application of a Fourier transform (FFT);

the selection of the samples for which m+n is an even-parity value;

the correction of the phase $\theta_{m,n}$ induced by the transmission channel;

the correction of the phase corresponding to the term $e^{i\phi_{m,n}}$ the selection of the real part of the coefficient obtained $\tilde{a}_{m,n}$ corresponding to the transmitted coefficient amen weighted by the amplitude response $\rho_{m,n}$ of the transmission channel.

Preferably, this reception method comprises a step for the frequency and/or time de-interlacing of said real digital coefficients $\tilde{a}_{m,n}$ and, possibly, of the corresponding values $\rho_{m,n}$ of the amplitude response of the channel, said de-interlacing being the reverse of an interlacing implemented at transmission and/or a step of weighted-decision decoding that is adapted to the channel encoding implemented at transmission.

The invention also relates to the corresponding receivers.

Finally, the invention also relates to a preferred method for the building of a prototype function x(t) for a signal as described here above. This method is presented in the appendices here below.

5. DESCRIPTION OF PARTICULAR EMBODIMENTS OF THE INVENTION

5.1. List of Figures

A: the prototype function x(t);

B: the linear Fourier transform of the prototype function;

C: the modulus of the linear ambiguity function (as defined in Appendix 2);

D: the intersymbol function (as defined in Appendix 2);

E: the decrease of the signal in logarithmic scale

Figure 3:
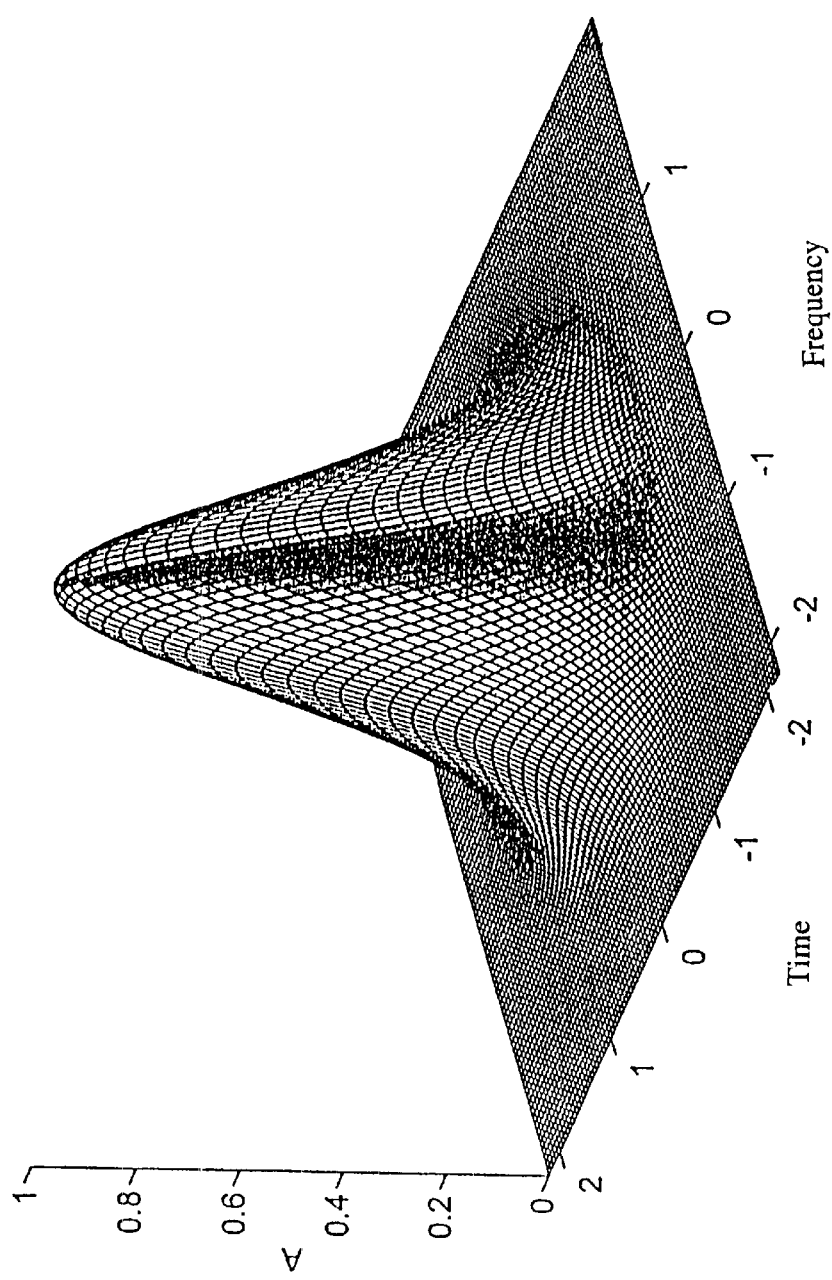
Figure 4:
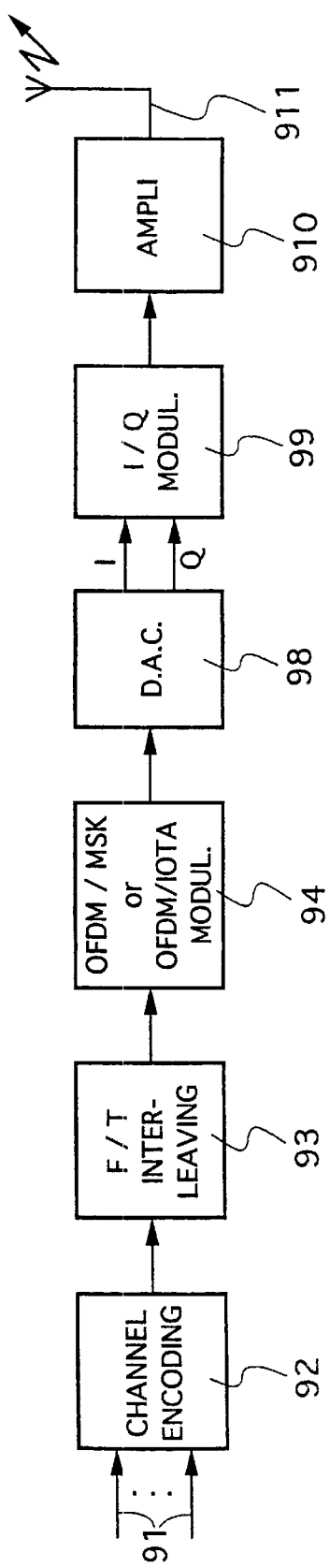
Figure 5:
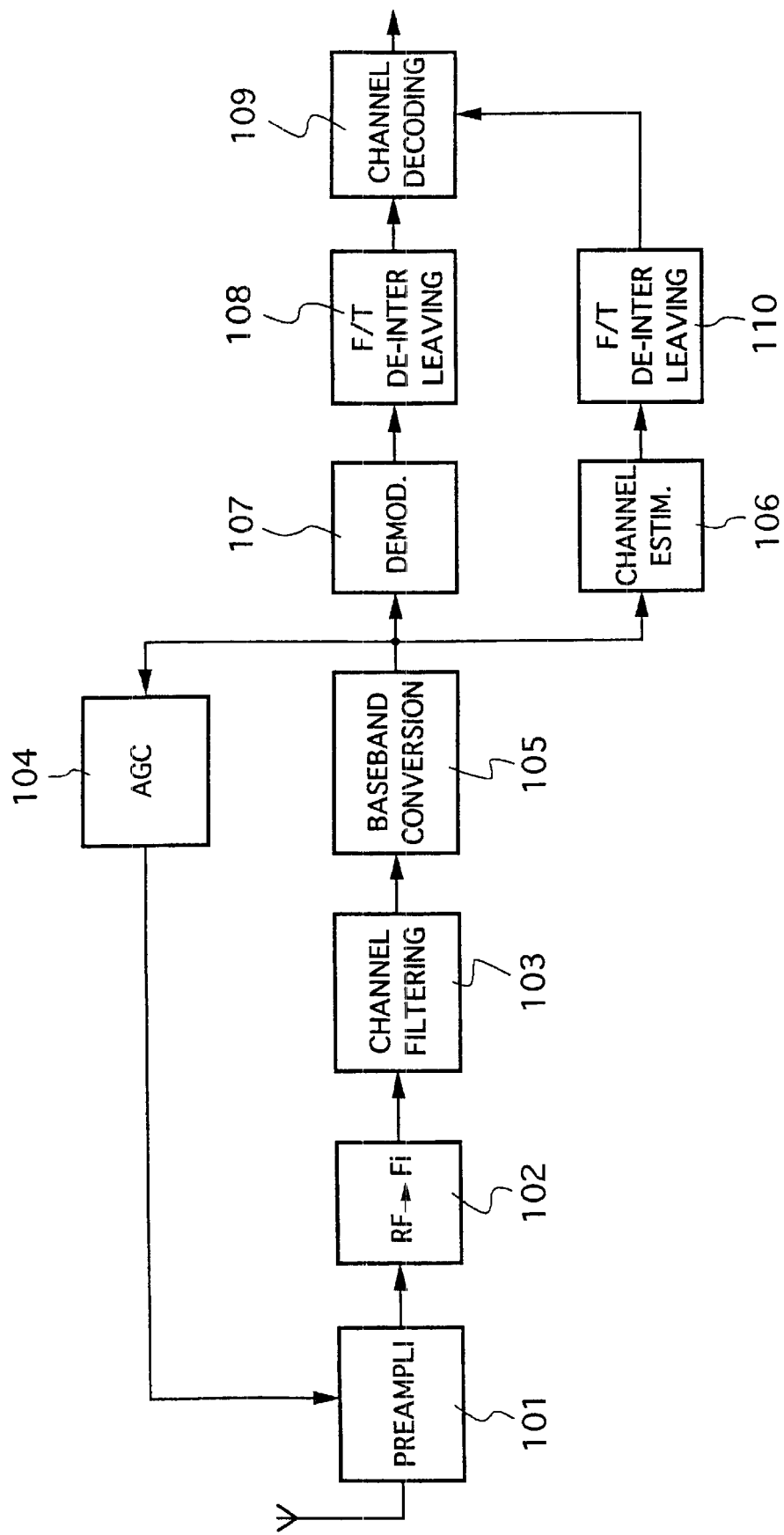
Figure 6:
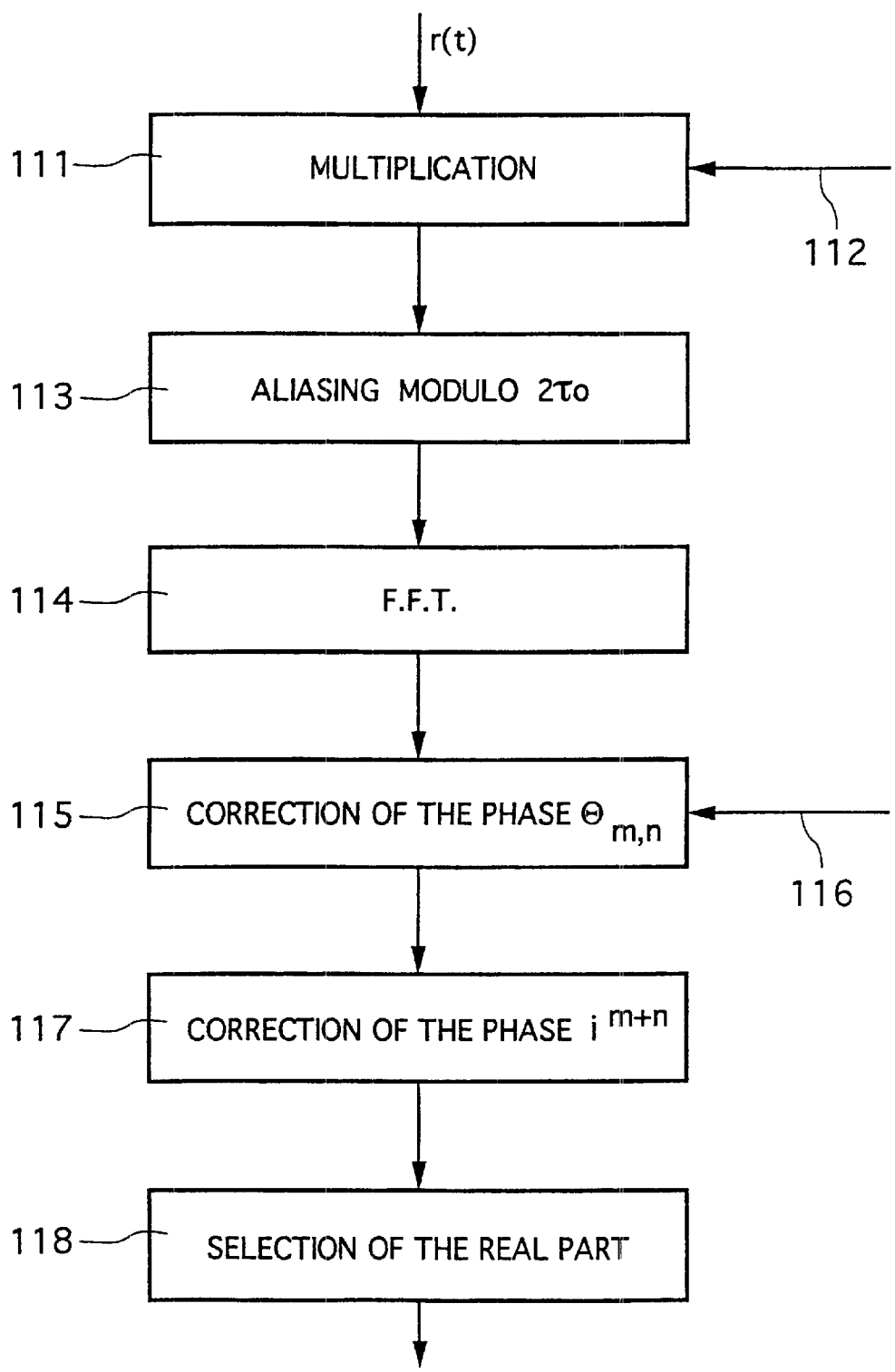

FIG. 3 shows the ambiguity function of a Gaussian function;

FIG. 4 is a block diagram of a transmitter (and of a corresponding/transmission method) that can be used according to the invention;

FIG. 5 is a block diagram of a receiver (and of the corresponding reception method) that can be used according to the invention;

FIG. 6 gives a more precise view of the method of the modulation implemented in the receiver of FIG. 5.

5.2. General Principles of the Invention

Figure 1:
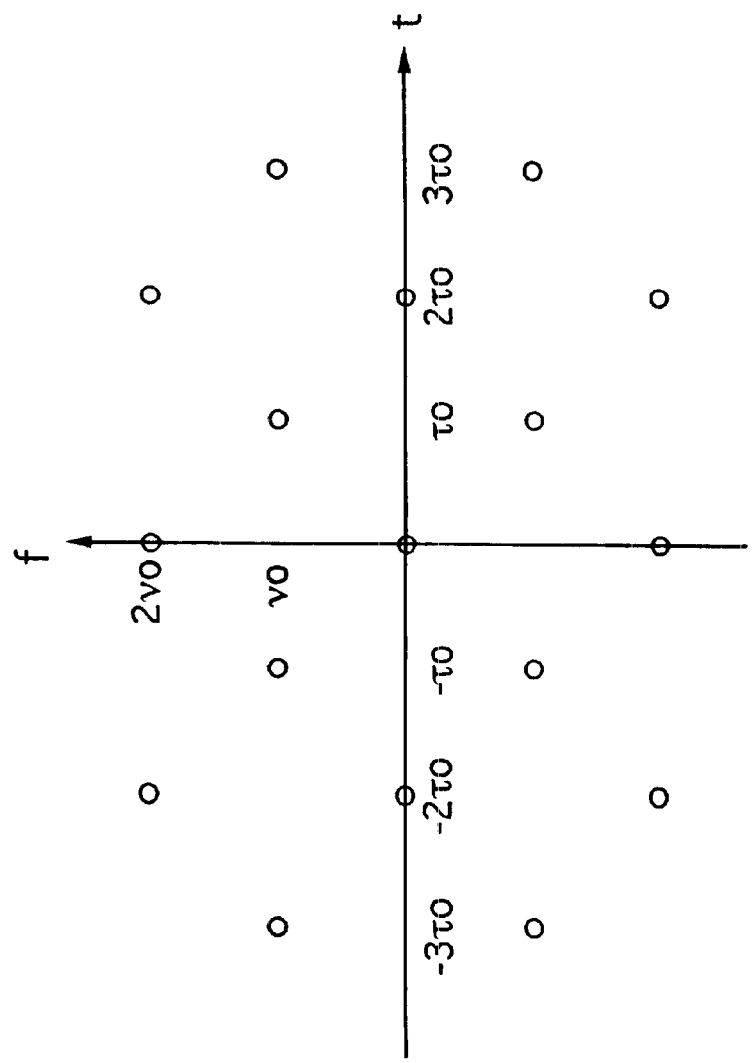
FIG. 1 illustrates a lattice with a density 1/2, corresponding to the one implemented in the case of the invention.

The invention is based on a wholly novel approach to the multicarrier signals of the OFDM/OQAM type built on non-orthogonal time-frequency lattices with a density 2. In particular, the invention proposes the use of a quincunxial lattice, as illustrated in FIG. 1, where only the locations of the lattice (defined by the indices m (frequency dimension) and n (temporal dimension)) such that m+n is an even parity value are used.

In other words, the complex envelope of a signal according to the invention, using this distribution in the time-frequency space, corresponds to the following equation:

$$s(t) = \sum_{m+n \text{ even}} a_{m,n} x_{m,n}(t)$$

where:

$a_{m,n}$ is a real coefficient representing the signal source chosen in a predetermined alphabet of modulation;

t represents time;

$x_{m,n}(t)$ is a basic function translated into the time-frequency space of one and the same even-parity prototype function x(t) taking real or complex values, namely:

$$x_{m,n}(t)=e^{i\phi_{m,n}}e^{i(2\pi m\nu_0 t+\phi)}x(t-n\tau_0) \text{ with } \nu_0\tau_0=1/2$$

with $\phi_{m,n}=(m+n+mn+(n^2-m^2)/2)\pi/2$ where $\phi$ is an arbitrary phase parameter, and where said basic functions $\{x_{m,n}\}$ are mutually orthogonal, the real part of the scalar product of two different basic functions being zero.

The invention also relates to modulations well suited to such lattices, and especially to the IOTA-$\pi/4$ modulation

5.3. The IOTA-$\pi/4$ Modulation

The IOTA-$\pi/4$ modulation results from a totally original approach to the field of signal processing that we have named the IOTA (Isotropic Orthogonal Transform Algorithm) transform, described in Appendix 3 and in the patent application FR-95 05455 already mentioned.

The IOTA-$\pi/4$ modulation may be obtained by a $-\pi/4$ rotation of this OFDM/IOTA modulation, as is described in appendix 3.

5.3.1. Equation of the Signal

The equation of the signal and the manner in which it is obtained are discussed in appendices 3 and 4.

5.3.2. Commentary on the Figures and Advantages Related to Rapid Decrease

In order to better highlight the advantages of the invention in a visual manner, the following are presented for the IOTA-$\pi/4$ modulation (FIGS. 2A to 2E):

A: the prototype function x(t);

B: the linear Fourier transform linearly of the prototype function;

C: the modulus of the linear ambiguity function (as described in Appendix 2);

D: the intersymbol function (as defined in Appendix 2).

Figure 2A:
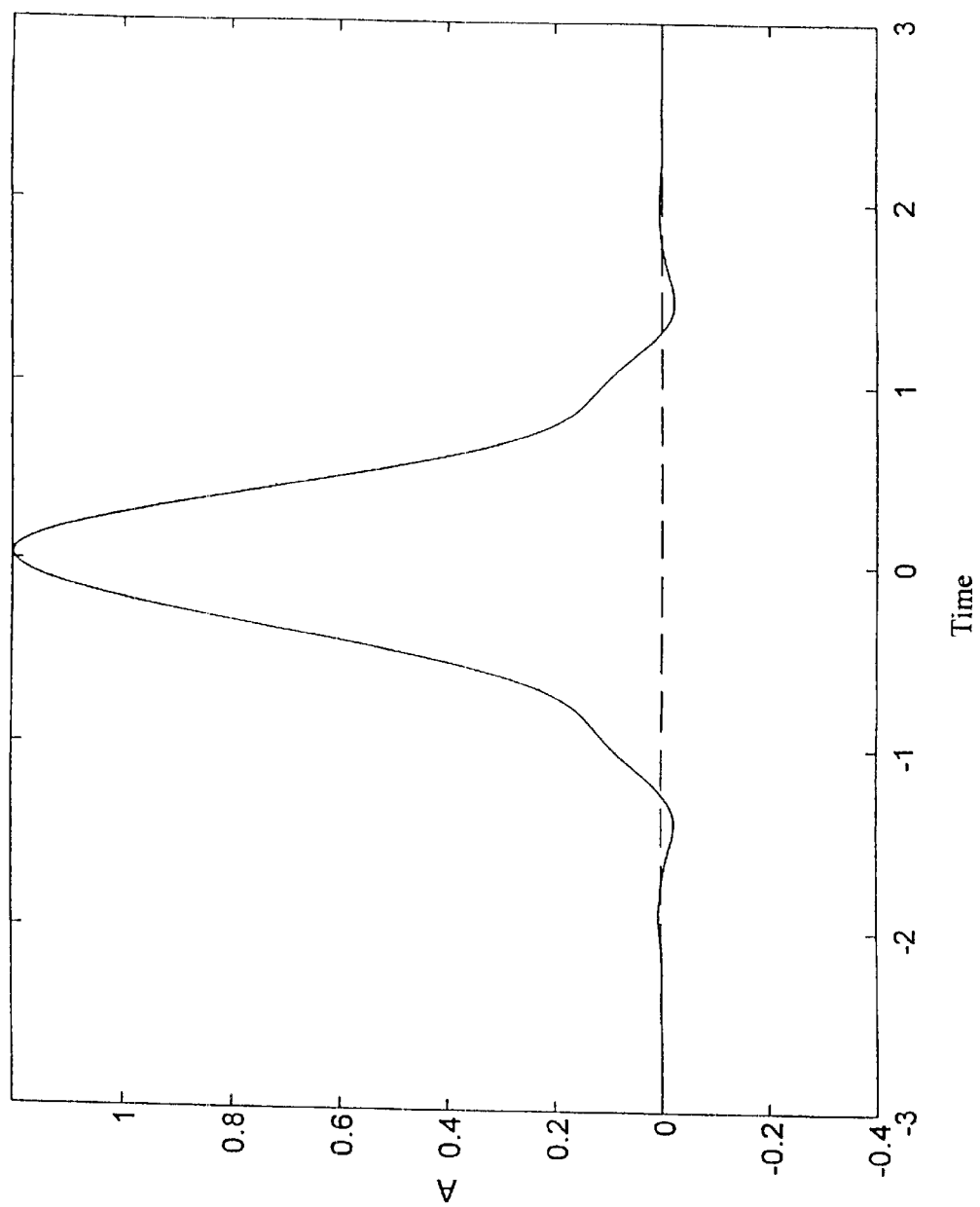
FIGS. 2A to 2E illustrate the IOTA-$\pi/4$ modulation of the invention, according to the following aspects.
Figure 2B:
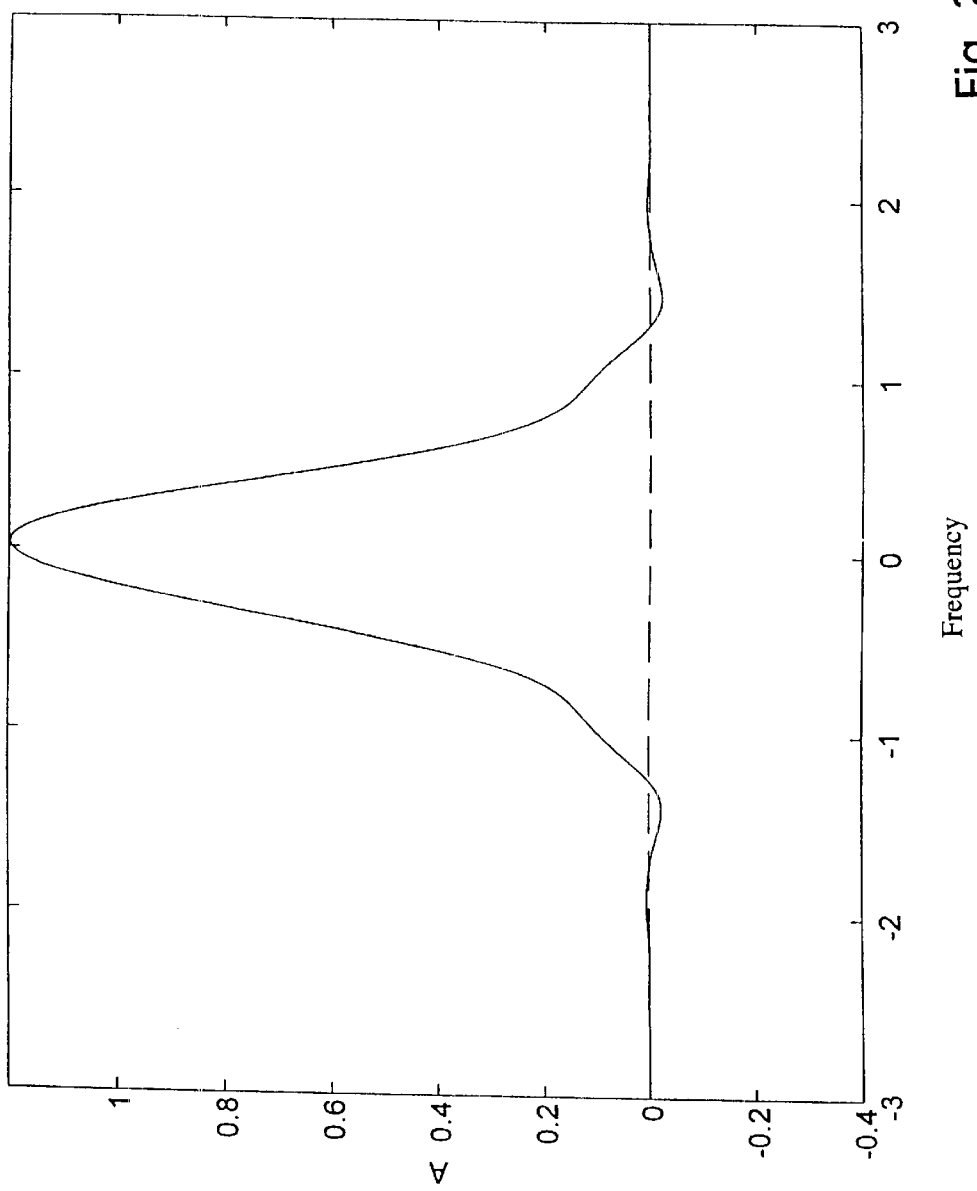
Figure 2C:
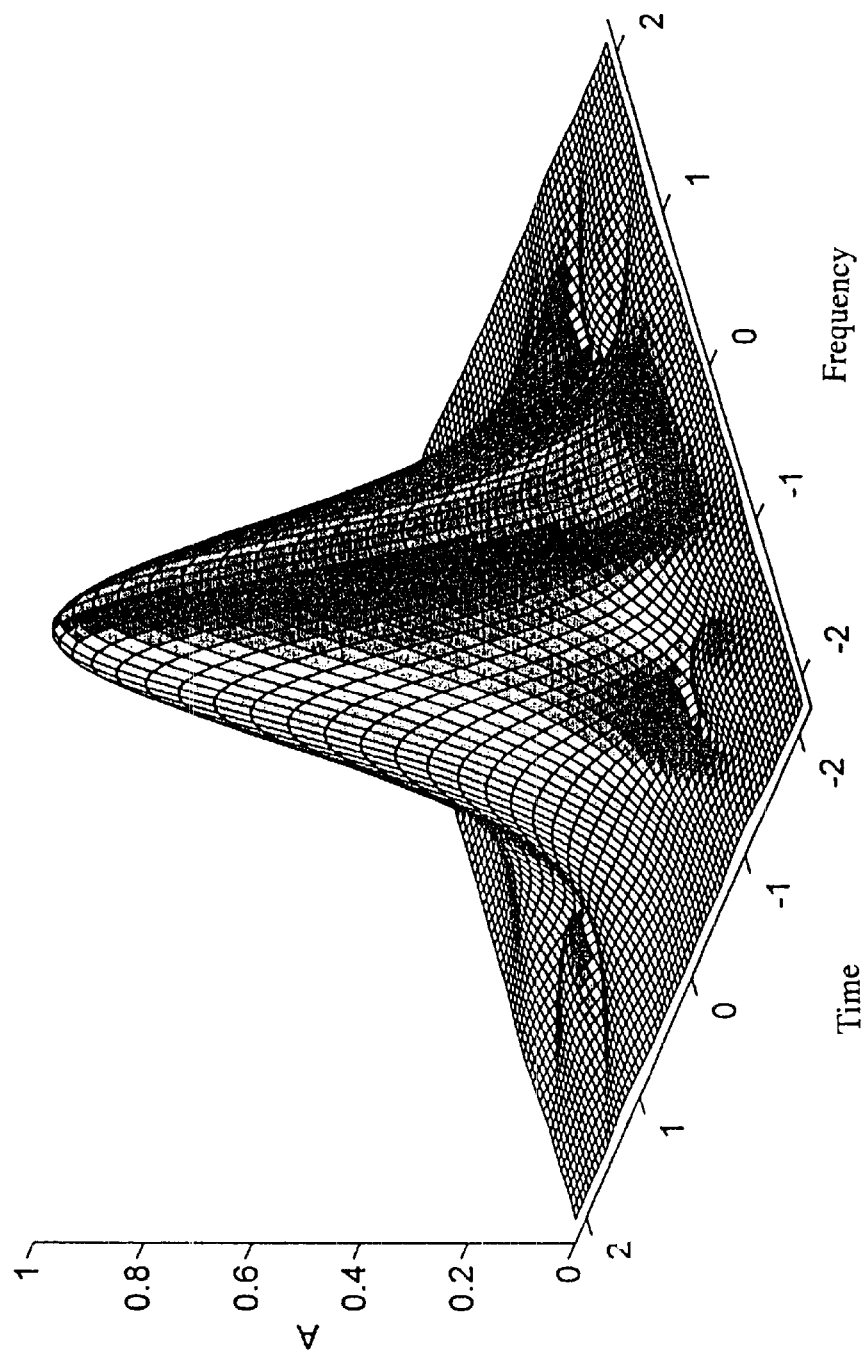
Figure 2D:
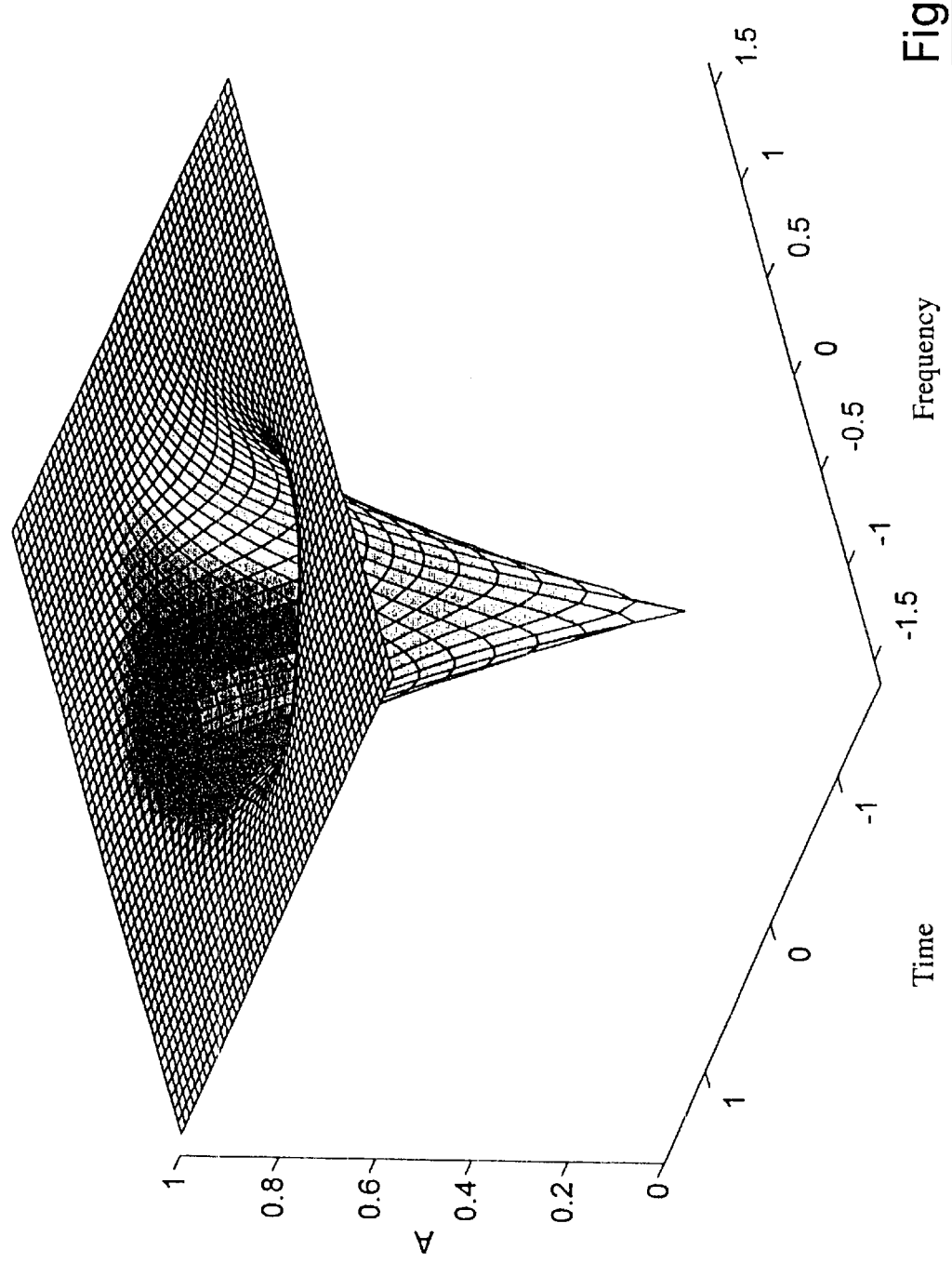

FIG. 2C makes it possible to judge the confinement of the prototype function in the time-frequency plane. FIG. 2D showing the intersymbol function enables an appreciation of the sensitivity of a modulation to delay and to the Doppler phenomenon. The phase errors are not considered since all the modulations are equivalent on this time-frequency plane.

These figures may be compared with those presented and commented on in the patent applications already referred to, for the other modulations discussed in the present patent application.

The OFDM/IOTA-$\pi/4$ modulation: This modulation therefore shows a fast decrease (in the mathematical sense of the term) in time and in frequency, thus making it possible to envisage equalization with the greatest possible efficiency. It furthermore has perfect symmetry with respect to these two axes. Its intersymbol function is quasi-ideal. In general, its behavior approaches that of the Gaussian function. The parameter $\xi$ is equal to 0.9769.

The ambiguity function of the function $\Im$ (FIG. 2C) can be compared to that of a Gaussian function, as illustrated in FIG. 3. The general shape of these two functions is very similar at the peak. However, it differs at the base.

Figure 2E:
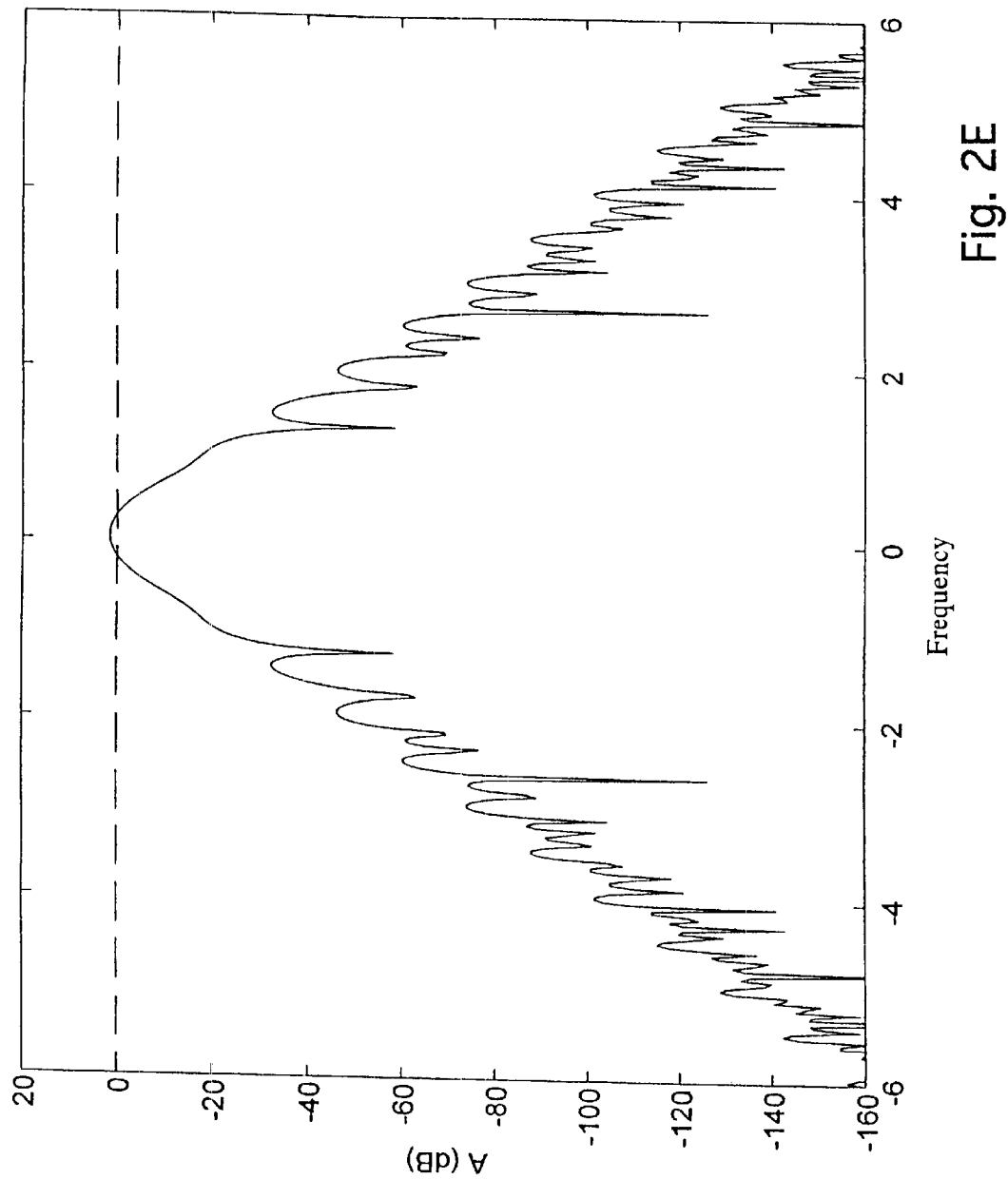

FIG. 2E gives a view in logarithmic scale of the decrease in time of the IOTA-$\pi/4$ signal. It can be seen that the amplitude of the signal decreases linearly in logarithmic scale (in time and frequency of course since the two aspects are identical), namely exponentially in terms of linear scale. This property therefore makes it possible, in a practical embodiment, to truncate the waveform and thus limit the complexity of the receiver.

It will be noted that the decrease of this modulation is very fast (linear in logarithmic scale), with a coefficient that is greater, by $\sqrt{2}$, than the OFDM/IOTA modulation.

5.6. Principle of a Transmitter

FIG. 4 shows a simplified block diagram of a transmitter of a signal according to the invention. The method of transmission can be deduced therefrom directly.

A binary source with a high bit rate (typically some tens of megabits/s) is considered. The term 'binary source' is understood to mean a series of data elements corresponding to one or more sampled, digital or analog source signals 91 of all types (sounds, images, data). These binary data elements are subjected to a binary-to-binary channel encoding 92 adapted to fading channels. It is possible for example to use a trellis coded modulation possibly concatenated with a Reed-Solomon code. More specifically, if a spectral efficiency of 4 bits/Hz is desired, it is possible to use a code with an efficiency of 2/3 associated with an 8AM modulation taking eight amplitude levels.

Then, according to the principle explained in the patent FR-88 15216, corresponding to U.S. Pat. No. 5,191,576, these encoded data elements are distributed (93) in the time-frequency space so as to provide the necessary diversity and decorrelate the Rayleigh fading that affects the symbols transmitted.

More generally, a first binary-to-binary encoding, a time and frequency interlacing and a mapping operation are carried out. It is clear that the interlacing may be done, without distinction, before or after the mapping depending on the needs and the codes used.

At the end of this encoding operation, there are real symbols to be transmitted. The principle of the making of the OFDM/IOTA-$\pi/4$ modulator 94 is similar to that of an OFDM/OQAM transmitter. Reference may be made to FIG. 3 of "An Orthogonally Multiplexed QAM System Using the Discrete Fourier Transform" by B. Hirosaki, IEEE Trans. Comm., Vol. COM-29, pp. 982–989, July 1981 for a detailed description of the modulation system. In this document, a direct digital implementation of an OQAM system is disclosed, based on an N/2 point DFT processing. According to this system, a transmitter comprises:

- a pre-processor, fed by several channels to be transmitted, and delivering symbols to be transmitted;
- an OFFSET FFT fed by the symbols to be transmitted;
- a low rate FIR bank, fed by the OFFSET FFT;
- a frequency shift and complex-real converter module, fed by the FIR bank;
- a multiplexer, providing for the digital signal to be transmitted;
- a D/A converter and a filter (BPF) to turn the digital signal into an analog, which will be transmitted to the receiver.

The receiver comprises means complementary to those of the transmitter, so as to carry out reverse operations, and provide for the data of the different channels. To build the signal to be transmitted, the symbols of the same order n are grouped together, and the following is computed:

$$s(t) = \sum_{a+n\_even} a_{m,n} e^{i\phi_{m,n}} e^{i(2\pi n_v 0 t + \varphi)} x_{(t-\tau_0)} \qquad (30)$$

This operation may advantageously be done in digital form by a fast Fourier transform (FFT) relating to all the symbols of the same order n (it is possible to halve the number of points of the FFT, owing to the decimation performed on the lattice of the invention), followed by a multiplication of the resultant waveform by the prototype function IOTA-$\pi/4$ and finally by an addition of the symbols of different ranks (summation according to the index n).

The complex signal thus generated is then converted into analog form 98 and then transposed to the final frequency by a two-channel in-quadrature modulator 99 (I&Q modulator) and finally amplified 910 before being transmitted 911.

5.5. Principle of a Receiver

FIG. 10 gives a schematic illustration of a receiver of a signal according to the invention (as well as the corresponding reception method).

The OFDM/IOTA-$\pi/4$ receiver is substantially similar to the one adapted to the OFDM/OQAM modulation. The input stages are conventional. The signal is preamplified 101 and then converted into intermediate frequency 102 in order to obtain the channel filtering 103. The intermediate frequency signal is then converted into baseband at 105 on two channels in quadrature. In addition, the automatic gain correction (AGC) functions 104 are performed. The AGC controls the preamplification 101.

Another solution consists in transposing the intermediate frequency signal to a low carrier frequency so as to sample the signal on a single channel, the complex representation being then obtained by digital filtering. Alternately, the IRF signal may be transposed directly into baseband (direct conversion), the channel filtering being then done on each of the two channels I&Q. In every case, it is possible to return to a discrete representation of the signal of the complex envelope corresponding to the received signal.

In order to provide a detailed description of the digital processing in baseband, we shall consider a multicarrier type modulation characterized by the equation of the complex envelope of the transmitted signal:

$$s(t) = \sum_{m,n} a_{m,n} \mathfrak{I}_{m,n}(t) \quad (31)$$

Let us take a transmission channel characterized by its variable transfer function T(f,t) (see Appendix 2). The complex envelope of the received signal r(t) is written as follows:

$$r(t) = \int S(f) T(f,t) e^{2i\pi ft} df \quad (32)$$

The demodulator estimates (106) the transfer function T(f,t) by conventional means which for example may use a reference lattice of explicit carriers according to the patent FR-90 01491. To demodulate the signal proper (107), the channel is likened locally to a multiplier channel characterized by an amplitude and a phase corresponding to the value of T(f,t) for the instant and the frequency considered. To estimate $a_{m,n}(t)$, the received signal is therefore identified with the signal:

$$\tilde{r}(t) = \int S(f) T(mv_0, n\tau_0) e^{2i\pi ft} df = T(mv_0, n\tau_0) s(t) \quad (33)$$

It shall be supposed that:

$$T(mv_0, n\tau_0) = \rho_{m,n} e^{i\theta_{m,n}} \quad (34)$$

The demodulator therefore performs the following processing operation:

$$\tilde{a}_{m,n} = Re \int r(t) e^{-i\theta_{m,n}} \mathfrak{I}_{m,n}^*(t) dt \quad (35)$$

In the case of a stationary channel with a transfer function $\rho e^{i\theta}$, the following is found obviously:

$$\tilde{a}_{m,n} = \rho a_{m,n} \quad (36)$$

In practice, the processing 107 is performed in digital form according to the method shown in FIG. 11. The receiver works similarly to an OFDM/OQAM receiver [13–16]. It performs the following processing operations:

the multiplication 111 of said received signal r(t) by its prototype function x(t) 112;
the "aliasing" 113 of the filtered waveform modulo $2t_0$;
the application 114 of a Fourier transform (FFT);
the selection of the samples for which m+n is an even parity value (the selection being done possibly during the application of the FFT);
the correction 115 of the phase $\theta_{m,n}$ as a function of the estimation of the channel 116, comprising for example an estimation $\rho_{m,n}$ of the amplitude response and an estimation $\theta_{m,n}$ of the phase response of the transmission channel;
the correction 117 of the phase $e^{i\Phi_{m,n}}$;
the selection 118 of the real part, weighted by the amplitude response $\rho_{m,n}$.

This algorithm therefore enables the comprehensive computation of all the coefficients of a given index n. The magnitude of the corresponding complexity is approximately twice that of the algorithm used for the OFDM/QAM.

The coefficients thus obtained are then de-interlaced 108, symmetrically with the interlacing implemented at transmission, and then decoded 109 advantageously according to a soft decision decoding technique implementing for example an algorithm of the Viterbi algorithm type. If the channel decoding takes account of the estimation of the response of the amplitude of the channel $\rho_{m,n}$, the corresponding values are also de-interlaced 110. Furthermore, the de-interlacing is of course performed before or after the mapping depending on the point in time at which the interlacing has been carried out at transmission.

Appendix 4 gives a more detailed view of the operations performed.

APPENDIX 1: REFERENCES

[1] M. L. Doeltz, E. T. Heald and D. L. Martin, "Binary data transmission techniques for linear systems" Proceedings of the IRE, pp. 656–661, May 1957.
[2] R. R. Mosier, "A data transmission system using pulse phase modulation" IRE Conv. Rec. Ist Nat'l Conv Military Electronics (Washington, D.C., Jun. 17–19, 1957) pp. 233–238.
[3] G. A. Franco and G. Lachs, "An orthogonal coding technique for communications" 1961 IRE Internat'l Conv. Rec., vol. 9, pp. 126–133.
[4] H. F. Harmuth, "On the transmission of information by orthogonal time functions" AIEE Trans. (Communications and Electronics) vol. 79, pp. 248–255, July 1960.
[5] S. B. Weinstein and Paul M. Ebert, "Data transmission by frequency-division multiplexing using the discrete Fourier transform" IEEE Trans. Commun., vol. COM-19, pp. 628–634, October 1971.
[6] L. J. Cimini, "Analysis and simulation of a digital mobile channel using orthogonal frequency division multiplexing," IEEE Trans. Commun., vol. COM-33, pp. 665–675, July 1985.
[7] E. F. Casas and C. Leung, "OFDM for data communication over mobile radio FM channels—Part I: Analysis and experimental results" IEEE Trans. Commun., vol. 39, pp. 783–793, May 1991.
[8] E. F. Casas and C. Leung, "OFDM for data communication over mobile radio FM channels—Part II: Performance improvement" IEEE Trans. Commun., vol. 40, pp. 680–683, April 1992.
[9] I. Daubechies, "The wavelet transform, time-frequency localization and signal analysis" IEEE Trans. Inform. Theory, vol. IT-36, pp. 961–1005, September 1990.
[10] H. E. Jensen, T. Hoholdt, and J. Justesen, "Double series representation of bounded signals" IEEE Trans. Inform. Theory, vol. IT-34, pp. 613–624, July 1988.
[11] R. W. Chang, "Synthesis of band-limited orthogonal signals for multi-channel data transmission" Bell Syst. Tech. J., vol. 45, pp. 1775–1796, December 1966.
[12] B. R. Saltzberg, "Performance of an efficient parallel data transmission system" IEEE Trans. Commun. Technol., vol. COM-15, pp. 805–811, December 1967.
[13] R. W. Chang, "A theoretical study of performance of an orthogonal multiplexing data transmission scheme" IEEE Trans. Commun. Technol., vol. COM-16, pp. 529–540, August 1968.
[14] B. Hirosaki, "An analysis of automatic equalizers for orthogonally multiplexed QAM systems" IEEE Trans. Commun., vol. COM-28, pp. 73–83, January 1980.

[15] B. Hirosaki, "An orthogonally multiplexed QAM system using the discrete Fourier transform" IEEE Trans. Commun., vol. COM-29, pp. 982–989, July. 1981.
[16] B. Hirosaki, "A maximum likelihood receiver for an orthogonally multiplexed QAM system" IEEE Journal on Selected Areas in Commun., vol. SAC-22, pp. 757–764, September 1984.
[17] B. Hirosaki, S. Hasegawa, and A. Sabato, "Advanced group-band modem using orthogonally multiplexed QAM technique" IEEE Trans. Commun., vol. COM-34, pp. 587–592, June. 1986.
[18] John A. C. Bingham, "Multicarrier modulation for data transmission: An idea whose time has come" IEEE Communications Magazine, pp. 5–14, May 1990.
[19] P. M. Woodward, "Probability and information theory with application to radar" Pergamon Press, London 1953.
[20] F. Amoroso and J. A. Kivett, "Simplified MSK signalling technique" IEEE Trans. Commun., vol. COM-25, pp. 433–441, April 1977.
[21] P. A. Bello, "Characterization of randomly time-variant linear channels" IEEE Trans. Commun. Systems, pp. 360–393, December 1964.
[22] P. M. Woodward, "Probability and information theory with application to radar" Pergamon Press, London 1953.
[23] M. Alard and R. Lassalle, "Principes de modulation et de codage canal en radiodiffusion numerique vers les mobiles" Revue de l'U.E.R, No. 224, August 1987, pp. 168–190.

APPENDIX 2

1. MODELLING OF THE CHANNEL

1.1. General Model

A dispersive channel may be considered to be a linear system having a pulse response that is variable in time. There are two ways of defining this pulse response. This approach will be based broadly on the conventions proposed in [21]:

the pulse response at input or input delay spread function $g(t,\tau)$ defined by:

$$r(t)=\int s(t-\tau)g(t,\tau)d\tau$$

where s(t) and r(t) respectively represent the signals transmitted and received, the pulse response at output or output delay spread function $h(t,\tau)$ defined by:

$$r(t)=\int s(t-\tau)h(t,\tau)d\tau$$

We evidently have $h(t,\tau)=g(t+\tau,\tau)\cdot h(t,\tau)$ represents the pulse response of the channel at the instant t. These conventions being established, it is possible to define the following characteristic functions:

the delay-Doppler spread function $U(\tau,\nu)$ characterized by:

$$g(t,\tau)=\int U(\tau,\nu)e^{i2\pi\nu t}d\nu$$

with $r(t)=\int\int U(\tau,\nu)s(t-\tau)e^{i2\pi\nu t}d\nu d\tau$ the Doppler-delay spread function $V(\nu,\tau)$ characterized by:

$$h(t,\tau)=\int V(\nu,\tau)e^{-i2\pi\nu t}d\nu$$

with $r(t)=\int\int V(\nu,\tau)s(t-\tau)e^{i2\pi\nu(t-\tau)}d\nu d\tau$

Or quite simply:

$$V(\nu,\tau)=e^{i2\pi\nu t}U(\tau,\nu)$$

the time-variant transfer function $T(f,t)$ characterized by:

$$T(f,t)=\int g(t,\tau)e^{-i2\pi f\tau}d\tau$$

with $r(t)=\int S(f)T(f,t)e^{i2\pi ft}df$

The same equation as in the case of a stationary channel is therefore got again, the difference simply being that the transfer function becomes variable in time. This transfer function $T(f,t)$ is the 2D Fourier transform of $U(\tau,\nu)$, namely:

$$T(f,t)=\int\int U(\tau,\nu)e^{-i2\pi\tau f}e^{i2\pi\nu t}d\tau d\nu$$

In any case, it is assumed that $U(\tau,\nu)$ has a bounded support. This means that the transfer function $T(f,t)$ can be represented by a lattice of discrete values by virtue of the sampling theorem.

1.2. The Static Delay-Doppler Model

The delay-Doppler model is defined by the equation:

$$r(t)=\int\int U(\tau,\nu)s(t-\tau)e^{i2\pi\nu t}d\tau d\nu$$

This equation shows the channel as a sum of elementary channels characterized by an amplitude, a phase, a temporal offset and a frequency offset. It is therefore legitimate to take an interest in the behavior of the various existing modulations of this type of channel, which shall be named the static delay-Doppler model.

The equation of the channel is written then in the following simplified form:

$$r(t)=Ae^{i\theta}s(t-\tau)e^{i2\pi\nu t}$$

2. PERFORMANCE CHARACTERISTICS OF THE OFDM IN THE NON-STATIONARY CHANNELS

2.1. General Case

Let us consider an OFDM multicarrier modulation of any type (OFDM/QAM, OFDM/OQAM or OFDM/IOTA) characterized by the generic equation:

$$s(t)=\sum_{k\in E}a_k x_k(t)$$

$a_k$ being real variables, E being a 2D lattice with a density 2 in the time-frequency space, the functions $x_k(t)$ being translated in time and in frequency by one and the same prototype function $x(t)$ constituting a Hilbert base of $L^2(R)$.

$$x_k(t)=e^{i\phi_k}x(t-\tau_k)e^{i2\pi\nu_k t}, k\in E$$

It will be noted that no hypothesis is made on the structure of the lattice E. In the particular case of the OFDM/QAM, this lattice can be divided into two co-localized sub-lattices with phases in quadrature.

The demodulation operation can be written as follows:

$$\hat{a}_n=\text{Re}\left[e^{-i\phi}\int r(t)x_n^*(t)dt\right]$$

φ being a phase estimated by the demodulator and r(t) being the complex envelope of the signal received. It is therefore possible to write:

$$\hat{a}_n=\text{Re}\left[e^{-i\phi}\int\left[\int\int U(\tau,\nu)s(t-\tau)e^{i2\pi\nu t}d\tau d\nu\right]x_n^*(t)dt\right]$$
$$=\text{Re}\left[e^{-i\phi}\int\int U(\tau,\nu)\left[\int s(t-\tau)e^{i2\pi\nu t}x_n^*(t)dt\right]d\tau d\nu\right]$$

Now $$\int s(t-\tau)e^{i2\pi\nu t}x_n^*(t)dt = \sum_k a_k \int x_k(t-\tau)e^{i2\pi\nu t}x_n^*(t)dt =$$

$$\sum_k a_k e^{i(\phi_k-\phi_n)}e^{2i\pi(\nu+\nu_k-\nu_n)(\tau+\tau_k+\tau_n)}A_x(\tau_n-\tau_k-\tau, \nu_n-\nu_k-\nu)$$

It is deduced therefrom that:

$$\hat{a}_n = \sum_k a_k \text{Re}\left[e^{-i\phi}e^{i(\phi_k-\phi_n)}\right.$$
$$\left.\int\int e^{2i\pi(\nu+\nu_k-\nu_n)(\tau+\tau_k+\tau_n)}U(\tau,\nu)A_x(\tau_n-\tau_k-\tau, \nu_n-\nu_k-\nu)d\tau d\nu\right]$$

The optimum value of $\phi$ is the one that maximizes the coefficient $\hat{a}_n$, giving:

$$\phi = \text{Arg}\int\int e^{2i\pi\nu\tau}U(\tau,\nu)A_x(-\tau,-\nu)d\tau d\nu\tau$$

Although they are general, the above equations can hardly be manipulated. However they show that the useful signal and the intersymbol appear as integrations of the ambiguity function weighted by the delay-Doppler spread function.

2.2. Case of the Static Channel

If we look at a static delay-Doppler type of channel, characterized by a phase $\theta$, a delay $\tau$ and an offset $\nu$ (the amplitude A will be normalized at 1), the demodulation will be done similarly by introducing a phase parameter $\phi$ into the estimator. The result of this operation is written as follows:

$$\hat{a}_n = \text{Re}\left[\int r(t)x_n^*(t)e^{-i\phi}dt\right] = \text{Re}\left[e^{i\theta-\phi}\int s(t-\tau)e^{2i\pi\nu t}x_n^*(t)dt\right]$$

$$= \sum_{k \in E} a_k \text{Re}\left[\int e^{i(\theta-\phi)}x_k(t-\tau)e^{2i\pi\nu t}x_n^*(t)dt\right]$$

$$= \sum_{k \in E} a_k \text{Re}\left[\int e^{i(\phi-\theta)}e^{-2i\pi\nu(t+\tau)}x_n(t+\tau)x_k^*(t)dt\right]$$

$$= \sum_{k \in E} a_k c_k,$$

$$\text{avec } c_k = \text{Re}\left[\int e^{i(\phi-\theta)}e^{-2i\pi\nu(t+\tau)}x_n(t+\tau)x_k^*(t)dt\right]$$

The demodulated signal is therefore finally written as:

$$\hat{a}_n = c_n a_n + \sum_{k \in E, k \neq n} c_k a_k$$

The second term represents the intersymbol interference (ISI). If the data elements $a_k$ are considered to be independent random variables with a variance $\sigma^2$, the variance I of the ISI is written as follows:

$$I = \sum_{k \in E, k \neq n} c_k^2 \sigma^2$$

Now, the coefficients $c_k$ are the coefficients of the breakdown of the function $e^{i(\phi-\theta)}e^{-2i\pi\nu(t-\tau)}x_n(t+\tau)$, with a norm equal to unity, on the Hilbert base of the functions $x_k(t)$. We therefore have:

$$\sum_{k \in E} c_k^2 = 1 \text{ et } I = (1-c_n^2)\sigma^2$$

In other words, the variance of the received signal is constant and is distributed between the "useful" signal $c_n a_n$ and ISI, having a variance $I=(1-c_n^2)\sigma^2$. The computation of the coefficient $c_n$ gives:

$$c_n = \text{Re}\left[\int e^{i(\phi-\theta)}e^{-2i\pi\nu(t+\tau)}x_n(t+\tau)x_n^*(t)dt\right]$$

$$= \text{Re}\left[e^{i(\phi-\theta-\pi\nu\tau)}\int e^{-2i\pi\nu t}x_n(t+\tau/2)x_n^*(t-\tau/2)dt\right]$$

$$= \text{Re}[e^{i(\phi-\theta-\pi\nu\tau)}A_{x_n}(\tau, \nu)]$$

Where Axn($\tau$,$\nu$) represents the ambiguity function of $x_n$ (see also appendix 3) giving:

$$A_{x_n}(\tau,\nu) = e^{2i\pi(\nu_n\tau-\tau_n\nu)}A_x(\tau,\nu)$$

Finally, it is possible to write:

$$c_n = \text{Re}[e^{i(\phi-\theta-\pi\nu\tau)}e^{2i\pi(\nu_n\tau-\tau_n\nu)}A_x(\tau,\nu)]$$

It will be assumed that the demodulation phase $\phi$ is written in the form $\phi_{opt}+\Delta\phi$, where $\phi_{opt}$ is the demodulation phase that minimizes the ISI, i.e. maximizes $c_n$, giving:

$$\phi_{opt} = \theta + \pi\nu\tau + 2\pi(\tau_n\nu - \nu_n\tau)$$

Then, the variance of the ISI can be written simply as follows:

$$I = (1 - (\text{Re}[A_x(\tau, \nu)e^{i\Delta\phi}])^2)\sigma^2$$

When the prototype function is an even order function (which corresponds to the case of the method of construction of the Hilbert bases described in the main part of this document), the ambiguity function is real and we therefore have:

$$I = (1-A_x^2(\tau,\nu)\cos^2\Delta\phi))\sigma^2$$

This result is quite remarkable since it shows that the sensitivity to the delay and to Doppler phenomena of any multicarrier modulation depends only on the ambiguity function of its prototype function. Hereinafter, the term normalized "intersymbol function" (used loosely to designate the intersymbol interference function), will be used to designate the function $Is(\tau,\nu) = \sqrt{1-A_x^2(\tau,\nu)}$ in general), representing the mean quadratic value of the intersymbol normalized by the mean quadratic value of the data elements in the case of an estimation of optimal phase.

3. COMPARATIVE ANALYSIS OF THE DIFFERENT TYPES OF OFDM

3.1. Theoretical Limits

The description here below shall deal with the properties of the intersymbol function. It is observed that the sensitivity of a multicarrier modulation is directly related to the behavior of the ambiguity function of the corresponding prototype function in the vicinity of (0,0). The problem raised is quite similar to the problems of uncertainty encountered in the field of radar and reference may be made to the abundant literature on the subject (see for example [22]). Without any loss of generality, it is possible to choose a function x(t), by an appropriate temporal and frequency translation in such a way that its first order moments are zero, namely:

$$\int t|x(t)|^2 dt = \int f|X(f)|^2 df = 0$$

Under these conditions, it is easy to verify that the partial derivatives of the first order cancel each other out:

$$\frac{\partial A_x}{\partial v}(\tau, v) = -2i\pi \int e^{-2i\pi vt} tx(t+\tau/2)x^*(t-\tau/2)dt \Rightarrow$$

$$\frac{\partial A_x}{\partial v}(0, 0) = -2i\pi \int t|x(t)|^2 dt = 0$$

$$\frac{\partial A_x}{\partial \tau}(\tau, v) = -2i\pi \int e^{-2i\pi f\tau} fX(f+v/2)X^*(f-v/2)df \Rightarrow$$

$$\frac{\partial A_x}{\partial \tau}(0, 0) = -2i\pi \int f|X(f)|^2 df = 0$$

It is possible to characterize the behavior of the ambiguity function around (0,0) on the basis of the second order partial derivatives:

$$\frac{\partial^2 A_x}{\partial \tau \partial v}(\tau, v) = -i\pi \int te^{-2i\pi vt}(x'(t+\tau/2)x^*(t-\tau/2) - x(t+\tau/2)x'^*(t-\tau/2))dt \Rightarrow$$

$$\frac{\partial^2 A_x}{\partial \tau \partial v}(0, 0) = 2\pi \int t \Im m[x'(t)x^*(t)]dt$$

It will be assumed that $$\frac{\partial^2 A_x}{\partial \tau \partial v}(0, 0) = \mu_x$$

$$\frac{\partial^2 A_x}{\partial v^2}(\tau, v) = -4\pi^2 \int e^{-2i\pi vt} t^2 x(t+\tau/2)x^*(t-\tau/2)dt \Rightarrow$$

$$\frac{\partial^2 A_x}{\partial v^2}(0, 0) = -4\pi^2 \int t^2 |x(t)|^2 dt = -4\pi^2 \Delta t^2$$

$$\frac{\partial^2 A_x}{\partial \tau^2}(\tau, v) = -4\pi^2 \int e^{-2i\pi f\tau} f^2 X(f+v/2)X^*(f+v/2)dt \Rightarrow$$

$$\frac{\partial^2 A_x}{\partial \tau^2}(0, 0) = -4\pi^2 \int f^2 |X(f)|^2 df = -4\pi^2 \Delta f^2$$

Let us consider the Taylor-Young development of the ambiguity function in (0,0):

$$A_x(d\tau, dv) = 1 - 2\pi^2(\Delta t^2 dv^2 + \Delta f^2 d\tau^2) + \mu dv d\tau + o(dv^2 + d\tau^2)$$

A deduction is made therefrom of the Taylor-Young development of the variance of the intersymbol:

$$I = (1 - (Re[A_x(\tau,v)]))^2 \cos^2 \Delta\phi)\sigma^2$$

that is:

$$I(d\tau,dv,d\phi) = \sigma^2[4\pi^2(\Delta t^2 dv^2 + \Delta f^2 d\tau^2) - 2\mu dv d\tau + d\phi^2 + o(dv^2 + d\tau^2 + d\phi^2)]$$

It is deduced therefrom that the intersymbol function Is accepts, at the outset, a tangential cone with the following equation:

$$z = \sqrt{4\pi^2(\Delta t^2 v^2 + \Delta f^2 \tau^2) - 2\mu v\tau}$$

The intersection of this cone with the plane z=1 (maximum intersymbol) demarcates a surface with an elliptic contour whose area ξ may be considered as a measure of the sensitivity to the delay and to the Doppler phenomenon. When $\mu_x$ is zero, this ellipse has the temporal and frequency axes as its axes of symmetry and extends from $\pm 1/2\pi\Delta f$ along the temporal axis and $\pm 1/2\pi\Delta t$ along the frequency axis. We therefore have:

$$\xi = 1/4i\Delta t \Delta f$$

In view of Heisenberg's inequality, ξ cannot exceed unity. This result is generalized if $\mu_x$ should be different from 0. Let us consider the function y(t) obtained by multiplying the function x(t) by a wobbulation:

$$y(t) = e^{i\pi\beta t^2} x(t) \rightarrow y'(t) = e^{i\pi\beta t^2}(x'(t) + 2i\pi\beta tx(t))$$

It is therefore possible to write:

$$\mu_y = \frac{\partial^2 A_y}{\partial \tau \partial v}(0, 0) = 2\pi \int t \Im m[y'(t)y^*(t)]dt$$

$$= 2\pi \int t \Im m[x'(t)x^*(t)]dt + 4\pi^2 \beta \int t^2 |x(t)|^2 dt = \mu_x + 4\pi^2 \beta \Delta t^2$$

It is therefore always possible to cancel $\mu_y$ by choosing β appropriately. Now, the operation of multiplication by a wobbulation achieves a simple change of axes of the associated ambiguity function with preservation of the areas. It is deduced therefrom that the parameter ξ is therefore always between 0 and 1.

This result is extremely important since it enables the comparison of the performance characteristics of all the MCMs in the dispersive channels on the basis of a single parameter. It can be seen therefore that these performance characteristics depend only on the concentration of the associated prototype function. The optimum is achieved virtually by the Gaussian function but this optimum is inaccessible since the Gaussian functions do not enable the building of a Hilbert base.

3.2. The Particular Case of the OFDM With Guard Interval

The OFDM modulations built from a lattice with a density of 1 constitute a degenerate case: owing to the Balian-Low-Coifman-Semmes theorem, the parameter ξ is zero. This result is furthermore totally general, and is applicable whatever the structure of the lattice of the barycenters of the base functions. Indeed, it is always possible, on the basis of the temporal wobbulation, Fourier transform and homothetic operators, to arrive at an unspecified orthogonal structure, for which the Balian-Low-Coifman-Semmes theorem is applicable. Now, these three operators achieve only changes in axes of the ambiguity function, with preservation of the areas. It is deduced therefrom that the parameter ξ is zero for all the modulations of this type.

The OFDM/QAM modulation is not exempt from this rule. In this case, the parameter Δf is infinite. This leads to a very high sensitivity to temporal shifts (the intersymbol function has a tangent that is vertical with respect to the temporal axis). However, OFDM/QAM has a trump card, not available to any other type of OFDM, in that within a symbol extended by a guard interval, there is an infinity of translated versions of the initial symbol. This unique character means that OFDM/QAM is really a singular point in the set of complex MCMs.

The guard interval creates a non-intersymbol zone that enables the cone tangential to the intersymbol function (in this case totally flattened in the temporal sense) to be converted into a prism whose intersection with the plane z=1 is a non-degenerate rectangle, namely one whose area is not zero. Reference may be made to FIG. 3 for a clearer understanding of the effect of the guard interval. Naturally, the use of a guard interval means leaving the context of the previous demonstrations and implies that the limiting of this area to unity no longer applies. However, the OFDM with guard interval may be compared with an optimum, virtual MCM modulation (with ξ=1), and the question may be asked as to what guard interval makes it possible to find an apparent, identical ξ. Let us consider an OFDM modulation built out of the prototype function:

$$x(t) = \begin{cases} \frac{1}{\sqrt{\tau_0}} & \text{if } |t| \le \tau_0/2 \\ 0 & \text{elsewhere} \end{cases}$$

It is immediately verified that $\Delta t^2 = \tau_0^2/12$. Consequently, the intersection of the prism tangential to the intersymbol function with the plane z=1 is limited in the frequency sense to $\pm\sqrt{3}/\pi\tau_0$. Let it be assumed that we are seeking to limit the intersymbol level to −10 dB. For an optimal modulation, with ξ=1, the area of the intersymbol zone smaller than −10 dB is in the range of 0.1. To obtain an equivalent result with an OFDM modulation with guard interval, it is necessary for the guard interval Δτ to be such that $\Delta\tau \times (2\sqrt{3}/\pi\tau_0/\sqrt{10}) = 0.1$, giving $\Delta\tau \approx 0.287\,\tau 0$. This value is quite considerable and clearly illustrates the price to be paid to obtain the operation of an OFDM system under unfavorable conditions of delay and Doppler phenomena.

APPENDIX 3

1. Introduction

This appendix gives all the demonstrations attesting to the existence of time-frequency transforms that are symmetrical with respect to the temporal and frequency axes. In this sense, these transforms are highly analogous with the Gabor transform which is characterized by perfect isotropy in all the directions of the time-frequency plane. Although the isotropy of these new transforms is only approximative, we shall loosely call them isotropes. The main difference with the Gabor transform is that these transforms are strictly orthogonal, making it possible to envisage their application to the domain of digital transmission. Indeed, the orthogonality of the transform ensures the preservation of the Euclidean metrics which is an essential property in a channel comprising an additive Gaussian noise.

Since the modulation systems resulting from this approach use isotrophic orthogonal transforms algorithms, we have christened them as IOTA modulation systems.

2. AMBIGUITY FUNCTION

Studies on the ambiguity function in the past have been greatly motivated by the development of radar techniques. This chapter recalls the main properties of this function and describes various operators acting on this function.

2.1 Reminders Pertaining to the Ambiguity Function 2.1.1 Definitions

Let us take a function x(t) and its Fourier transform X(f). With this function, it is possible to associate its temporal and frequency products respectively defined by:

$$\begin{cases} \gamma_x(t,\tau) = x(t+\tau/2)x^*(t-\tau/2) \\ \Gamma_x(f,\nu) = X(f+\nu/2)X^*(f-\nu/2) \end{cases}$$

The Wigner-Ville transform and the ambiguity function of x are then given by:

$$\begin{cases} W_x(t,f) = \int \gamma_x(t,\tau)e^{-2i\pi f\tau}d\tau = \int \Gamma_x(f,\nu)e^{2i\pi\nu t}d\nu \\ A_x(\tau,\nu) = \int \gamma_x(t,\tau)e^{-2i\pi\nu t}dt = \int \Gamma_x(f,\nu)e^{2i\pi f\tau}df \end{cases}$$

2.1.2 Properties of Symmetry of the Ambiguity Function

Let us take a function x(t). $x^-$ and $\tilde{x}$ are respectively used to note the functions defined as follows:

$$\begin{cases} x^-(t) = x(-t) \\ \tilde{x}(t) = x^*(-t) \end{cases}$$

We then have the relationships:

$$A_{x^-}(\tau,\nu) = \int e^{-2i\pi\nu t}x^-(t+\tau/2)\tilde{x}(t-\tau/2)dt = \int e^{-2i\pi\nu t}x(-t-\tau/2)x^*(-t+\tau/2)dt$$

namely, in taking u=−t:

$$A_{x^-}(\tau,\nu) = \int e^{2i\pi\nu u}x(u-\tau/2)x^*(u+\tau/2)du = A_x(-\tau,-\nu) = A_x^*(\tau,\nu)$$

We conclude therefrom especially that if a function x is an even-parity function, namely that $x=x^-$, its ambiguity function is real. Furthermore, the following relationship will be noted:

$$A_{x^*}(\tau,\nu) = \int e^{-2i\pi\nu t}x^*(t+\tau/2)x(t-\tau/2)du = A_x(-\tau,\nu)$$

In combining these two equations, we obtain:

$$A_{\tilde{x}}(\tau,\nu) = A_x(\tau,-\nu)$$

2.1.3 Ambiguity Function and Fourier Transform

The definition of the ambiguity function can be rewritten as follows:

$$A_x(\tau,\nu) = \int \Gamma_x(f,\nu)e^{2i\pi f\tau}df = \int \gamma_x(f,\nu)e^{-2i\pi f\tau}df = A_x(\nu,-\tau)$$

or again $A_x(\tau,\nu) = A_x(-\nu,\tau)$ 2.1.4 Ambiguity Function and Time-frequency Translation Let us consider a translated function of any prototype function x(t), namely:

$$x_k = e^{i\phi_k}e^{2i\pi\nu_k t}x(t-\tau_k)$$

The associated ambiguity function can be written as follows:

$$A_{x_k}(\tau,\nu) = \int e^{-2i\pi\nu t}e^{i\phi_k}e^{2i\pi\nu_k(t+\tau/2)}x(t-\tau_k+\tau/2)e^{-i\phi_k}e^{-2i\pi\nu_k(t-\tau/2)}x^*(t-\tau_k-\tau/2)dt =$$

$$\int e^{-2i\pi\nu t}e^{2i\pi\nu_k\tau}x(t-\tau_k+\tau/2)x^*(t-\tau_k-\tau/2)dt$$

giving, in assuming that $u=t-\tau_k$:

$$A_{x_k}(\tau,\nu) = \int e^{2i\pi(\nu_k\tau-\nu\tau_k)}\int e^{-2i\pi\nu u}x(u+\tau/2)x^*(u-\tau/2)du = e^{2i\pi(\nu_k\tau-\nu\tau_k)}A_x(\tau,\nu)$$

2.2 Orthogonality and Ambiguity Function 2.2.1 General Case

Two translated functions of one and the same function x(t) are considered, namely:

$$x_k = e^{i\phi_k}e^{2i\pi\nu_k t}x(t-\tau_k)$$

$$x_{k'} = e^{i\phi_{k'}}e^{2i\pi\nu_{k'} t}x(t-\tau_{k'})$$

The scalar product of these two functions is written as follows:

$$\langle x_k | x_{k'} \rangle = e^{i(\phi_k - \phi_{k'})} \int e^{2i\pi(\nu_k - \nu_{k'})t} x(t-\tau_k) x(t-\tau_{k'}) dt$$

giving, if we take $u = t - (\tau_k + \tau_{k'})/2$:

$$\langle x_k | x_{k'} \rangle = e^{i(\phi_k - \phi_{k'})} e^{2i\pi(\nu_k - \nu_{k'})(\tau_k + \tau_{k'})} \int e^{2i\pi(\nu_k - \nu_{k'})u} x(u + (\tau_{k'-\tau_k})/2) x^*(u - (\tau_{k'-\tau_k})/2$$

$$e^{i(\phi_k - \phi_{k'})} e^{2i\pi(\nu_k - \nu_{k'})(\tau_k + \tau_{k'})} A_x(\tau_{k'} - \tau_k, \nu_{k'} - \nu_k)$$

3. HILBERT BASES ON ORTHOGONAL LATTICES

3.1. General Principles of Construction

We consider a set of functions $\{x_{m,n}\}$ defined by:

$$x_{m,n}(t) = e^{i(m+n)\pi/2} e^{2i\pi m\nu_0 t} x(t - n\tau_0) \text{ a vec } \nu_0 \tau_0 = 1/2$$

A search is made for the conditions on $x(t)$ so that this set $\{x_{m,n}\}$ constitutes a Hilbert base of $H_R$. It is laid down that $x(t)$ is an even-parity function, whose ambiguity function $A_x$ is therefore real.

The scalar product in R of $x_{m,n}$ and of $x_{m',n'}$ can be written as follows:

$$\langle x_{m,n} | x_{m',n'} \rangle_R =$$
$$\text{Re}\left[e^{i(m+n-m'-n')\pi/2} e^{i\pi(m-m')(n+n')\nu_0\tau_0} A_x((n'-n)\tau_0, (m'-m)\nu_0] =$$
$$\text{Re}\left[e^{i((m-m')+(n-n')+(m-m')(n+n'))\pi/2)} A_x((n'-n)\tau_0, (m'-m)\nu_0]$$

The relationship of congruence modulo 2 will be written as follows:

$$(m-m') + (n-n') + (m-m')(n+n') \equiv 1 - (m-m'+1)(n-n+1)$$

Consequently, if $(m,n) \neq (m',n')$ modulo 2, the scalar product is zero. The lattice $\{x_{m,n}\}$ can therefore be decomposed into four sub-lattices characterized by: {m even, n even}, {m even, n odd}, {m odd, n even}, {m odd, n odd}. The orthogonality between functions belonging to different sub-lattices is therefore automatic, and does not depend on properties of the prototype function, once this prototype function is an even value.

What remains to be done then is to ensure that the functions of one and the same sub-lattice are mutually orthogonal. For this purpose, it is enough that the ambiguity function $A_x$ should verify:

$$A_x(2n\tau_0, 2m\nu_0) = 0 \forall (m,n) \neq (0,0)$$

It is therefore noted that the problem of the construction of Hilbert bases of $H_R$ on an orthogonal lattice with a density 2 amounts to the construction of an even-parity prototype function whose ambiguity function is cancelled on an lattice with a density of 1/2.

3.2 Methods of Orthogonaization

3.2.1 Temporal Orthogonalization

Definition

Let us take a function $x(t)$ of a Fourier transform $X(f)$. $O_t$ designates the temporal orthogonalization operator which associates a function $y(t)$ with $x(t)$. This function $y(t)$ is defined by its Fourier transform $Y(f)$:

$$Y(f) = \frac{X(f)}{\sqrt{\nu_0 \sum_k \|(X(f - k\nu_0)\|)^2}}$$

By construction we have:

$$\nu_0 \sum_m \|((Y(f - m\nu_0)\|)^2 = \nu_0 \sum_m \Gamma_y(f - m\nu_0, 0) = 1$$

giving, by reverse Fourier transform:

$$\left[\sum_n \delta(\tau - 2n\tau_0)\right] A_y(\tau, 0) = \delta(\tau)$$

or again $$A_y(2n\tau_0, 0) = 0 \; \forall n \neq 0 \text{ and } A_y(\tau, 0) = 1$$

The orthogonalization on the temporal axis is therefore achieved.

Let x be a Gaussian function and $y = O_t x$. Let us consider the expression:

$$\Gamma_y(f, 2m\nu_0) = Y(f + m\nu_0) Y^*(f - m\nu_0) = \frac{X(f + m\nu_0) X^*(f - m\nu_0)}{\nu_0 \sum_k \|X(f - k\nu_0)\|^2}$$

Since X is a Gaussian function we can write:

$$X(f + m\nu_0) X^*(f - m\nu_0) = c_m \|X(f)\|^2$$

where $c_m$ is a constant. It is deduced therefrom that:

$$\Gamma_y(f, 2m\nu_0) = c_m \Gamma_y(f, 0)$$

By reverse Fourier transform, we get:

$$A_y(\tau, 2m\nu_0) = c_m A_y(\tau, 0)$$

Consequently:

$$\forall m, \forall n \neq 0 \; A_y(2n\tau_0, 2m\nu_0) = 0$$

The temporal orthogonalization operator $O_t$ therefore orthogonalizes the entire lattice with the exception of the axis of frequencies.

Theorem 1

Let x be a Gaussian function and $y = O_t x$, then:

$$\forall m, \forall n \neq 0 \; A_y(2n\tau_0, 2m\nu_0) = 0$$

3.2.2 Frequency Orthogonalization

Definition

Let us take a function $x(t)$. $O_f$ designates the frequency orthogonalization operator which associates a function $y(t)$ with $x(t)$. This function $y(t)$ is defined by:

$$y(t) = \frac{x(t)}{\sqrt{\tau_0 \sum_k \|((x(t - k\tau_0)\|)^2}}$$

By construction we have:

$$\tau_0 \sum_n \|y(t-n\tau_0)\|^2 = \tau_0 \sum_n \gamma_y(t-n\tau_0, 0) = 1$$

giving, by Fourier transform:

$$\left[\sum_m \delta(\nu - 2m\nu_0)\right] A_y(0, \nu) = \delta(\nu) \text{ avec } \nu_0 \tau_0 = 1/2$$

or again $$A_x(0, 2m\nu_0) = 0 \; \forall m \neq 0 \text{ and } A_y(0,0) =$$

The orthogonalization on the frequency axis is therefore properly achieved.

Let x be a Gaussian function and $z=O_f y$, with $y=O_t x$. Let us consider the expression:

$$\gamma_z(t, 2n\tau_0) = z(t+n\tau_0)z^*(t-n\tau_0) = \frac{y(t+n\tau_0)y^*(t-n\tau_0)}{\tau_0 \sum_k \|y(t-k\tau_0)\|^2}$$

We can therefore write:

$$\gamma_z(t, 2n\tau_0) = \gamma_y(t, 2n\tau_0) P(t)$$

where $P(t)$ is a periodic function with a period $\tau_0$ which allows a series Fourier development of the following type: $\Sigma a_k e^{4i\pi k\nu_0 t}$ By Fourier transform we obtain:

$$A_z(2n\tau_0, \nu) = \sum_k a_k A_y(2n\tau_0, \nu - 2k\nu_0)$$

Now $$\forall m, \forall n \neq 0, A_y(2n\tau_0, 2m\nu_0) = 0 \rightarrow$$

$$\forall m, \forall n \neq 0, A_z(2n\tau_0, 2m\nu_0) = 0$$

Furthermore by construction $$\forall m \neq 0, A_z(0, 2m\nu_0) = 0$$

We therefore finally have:

$$\forall (m,n) \neq (0,0), A_z(2n\tau_0, 2m\nu_0) = 0$$

Thus, the ambiguity function of z gets cancelled outside (0,0) for all the multiples of $2\tau_0$ and $2\nu_0$, giving an lattice with a density 1/2.

Theorem 2

Let x be a Gaussian function and $z=O_f O_t x$, then:

$$\forall (m,n) \neq (0,0), A_z(2n\tau_0, 2m\nu_0) = 0$$

3.3. The Orthogonalization Operator O

Given the above, it can clearly be seen that there is a time-frequency scale which symmetrizes the writing of the equations. For this purpose, it is enough to choose $\tau_0 = \nu_0 = 1/\sqrt{2}$. The scales are then re-normalized accordingly without prejudice to the general purpose of the demonstration.

3.3.1 Definition

The term O designates the orthogonalization operator which associates the function y with a function x. This function y is defined by:

$$y(u) = \frac{2^{1/4} x(u)}{\sqrt{\sum_k \|x(u-k/\sqrt{2})\|^2}}$$

Furthermore, the term F will hereinafter denote the operator of the Fourier transform.

3.3.2 Idempotency of the Operator O

Let $z=Oy$ and $y=Ox$. It is possible to write:

$$z(u) = \frac{2^{1/4} y(u)}{\sqrt{\sum_k \|y(u-k/\sqrt{2})\|^2}}$$

$$= \frac{2^{1/4} y(u)}{\sqrt{\sum_k \left\|\frac{2^{1/4} x(u-k/\sqrt{2})}{\sqrt{\sum_{k'} \|x(u-(k+k')/\sqrt{2})\|^2}}\right\|^2}} = y(u)$$

We therefore have $OOx = Ox$, which shows the idempotency of the operator O.

In the same way, the dual operator $F^{-1}OF$ is also idempotent, since $F^{-1}OFF^{-1}OF = F^{-1}OOF = F^{-1}OF$.

3.3.3 Lemma 1

Let P be a periodical function with a period $1/\sqrt{2}$ and D a distribution with the form:

$$D(u) = \sum_k a_k \delta(u - k\sqrt{2})$$

Let x be any function:

$$[D*(Px)](u) = \sum_k a_k P(u-k\sqrt{2})x(u-k\sqrt{2}) = P(u)\sum_k a_k x(u-k\sqrt{2}) = [P(D*x)](u)$$

Lemma 1

Let P be a periodic function with a period $1/\sqrt{2}$ and D a distribution having the form:

$$D(u) = \sum_k a_k \delta(u - k\sqrt{2})$$

Let x be any function. We have:

$$D*(Px) = P(D*x)$$

3.3.4 Lemma 2

Let us take the function $y_\alpha$ defined by $y_\alpha = D*x_\alpha$, with $x_\alpha = (2\alpha)^{1/4} e^{-\pi\alpha u^2}$, and D being a distribution with the form:

$$D(u) = \sum_k a_k \delta(u - k\sqrt{2})$$

It is therefore possible to write:

$$y_\alpha(u) = \sum_k a_k x_\alpha(u - k\sqrt{2})$$

Let $z_\alpha = Oy_\alpha$. We have:

$$P_\alpha(u) = \frac{2^{1/4}}{\sqrt{\sum_k \|x_\alpha(u - k/\sqrt{2})\|^2}}$$

The sum under the root sign can be written as follows:

$$\sum_k \|y_\alpha(u - k/\sqrt{2})\|^2 = \sum_k \sum_{k',k''} a_{k'} a_{k''} x_\alpha(u - k/\sqrt{2} - k'\sqrt{2}) x_\alpha(u - k/\sqrt{2} - k''\sqrt{2})$$

Or again, by application of the result given in the appendix:

$$\sum_k \|y_\alpha(u - k/\sqrt{2})\|^2 = \sum_k \sum_{k',k''} a_{k'} a_{k''} e^{-(\pi\alpha(k'-k''))^2} \|x_\alpha(u - (k + k' + k'')/\sqrt{2})\|^2$$

then, by reorganizing the indices and redefining k as k+k'+k":

$$\sum_k \|y_\alpha(u - k/\sqrt{2})\|^2 = \sum_k \sum_{k',k''} a_{k'} a_{k''} e^{-(\pi\alpha(k'-k''))^2} \|x_\alpha(u - k/\sqrt{2})\|^2$$

It is therefore possible to write:

$$\sum_k \|y_\alpha(u - k/\sqrt{2})\|^2 = c \sum_k \|x_\alpha(u - k/\sqrt{2})\|^2$$

with $$c = \sum_{k',k''} a_{k'} a_{k''} e^{-(\pi\alpha(k'-k''))^2}$$

Consequently:

$$z_\alpha(u) = \frac{2^{1/4} y_\alpha(u)}{\sqrt{c \sum_k \|x_\alpha(u - k/\sqrt{2})\|^2}} = \frac{1}{\sqrt{c}} P_\alpha(u) y_\alpha(u)$$

with $$P_\alpha(u) = \frac{2^{1/4}}{\sqrt{\sum_k \|x_\alpha(u - k/\sqrt{2})\|^2}}$$

Let $$c_0 = \frac{1}{\sqrt{c}}$$

We have:

$$z_\alpha = c_0 P_\alpha y_\alpha = c_0 P_\alpha(D*x)$$

namely by application of the lemma 1:

$$z_\alpha = c_0 D*(P_\alpha x_\alpha)$$

Finally, we can write:

$$O[D*x_\alpha] = c_0 D*Ox_\alpha$$

Lemma 2
Let x be a Gaussian curve and D a distribution with the form:

$$D_\alpha(u) = \sum_k a_{\alpha,k} \delta(u - k\sqrt{2}),$$

then:

$O[D*x] = c_0 D*Ox$, where $c_0$ is a positive constant.

3.3.5 Commutative Character of the Operators O and $F^{-1}OF$

We shall now demonstrate that the operators O and $F^{-1}OF$ are commutated when they are applied to a Gaussian function.

Let $x_\alpha = (2\alpha)^{1/4} e^{-\pi\alpha u^2}$

Then $Fx_\alpha = x_{1/\alpha}$ and $Ox_\alpha = P_\alpha x_\alpha$

Given the periodic character of $P_\alpha$, its Fourier transform $D_\alpha$ can be written as follows:

$$D_\alpha(u) = \sum_k a_{\alpha,k} \delta(u - k\sqrt{2})$$

Let us consider the function $z_\alpha$ which is the result of the orthogonalization of $y_\alpha$ by O, $y_\alpha$ being the result of the orthogonalization of $x_\alpha$ by $F^{-1}OF$. We therefore have:

$$z_\alpha = OF^{-1}OFx_\alpha$$

it will also be noted that:

for any real even-parity function x, $F^{-1}x = Fx$
if c is a positive constant, $O[cx] = Ox$
for any real even-parity function x(u), Ox, Fx and $F^{-1}$ are even-parity real functions.

Given these observations, we can write:

$$OF^{-1}OFx_\alpha = OF^{-1}Ox_{1/\alpha} = OF^{-1}[P_{1/\alpha} x_{1/\alpha}] = O[D_{1/\alpha}*x_\alpha]$$

By application of the lemma 2:

$$O[D_{1/\alpha}*x_\alpha] = c_1 D_{1/\alpha}*Ox_\alpha = c_1 D_{1/\alpha}*(P_\alpha x_\alpha)$$

$c_1$ being a positive constant. It is deduced therefrom that:

$$OF^{-1}OFx_\alpha = c_1 D_{1/\alpha}*(P_\alpha x_\alpha)$$

In the same way, it can be written that:

$$F^{-1}OFOx_\alpha = F^{-1}OF[P_\alpha x_\alpha] = F^{-1}O[D_\alpha^* x_{1/\alpha}]$$

By application of the lemma 2:

$$O[D_\alpha^* x_{1/\alpha}] = c_2 D_\alpha^* O x_{1/\alpha} = c_2 D_\alpha^* (P_{1/\alpha} x_{1/\alpha})$$

$c_2$ being a positive constant. It is deduced therefrom that:

$$F^{-1}OFOx_\alpha = c_2 F^{-1}[D_\alpha^*(P_{1/\alpha} x_{1/\alpha})] = c_2 P_\alpha (D_{1/\alpha}^* x_\alpha)$$

Now, by application of the lemma 1:

$$D_{1/\alpha}^*(P_\alpha x_\alpha) = P_\alpha(D_{1/\alpha} x_\alpha)$$

We therefore have:

$$c_2 OF^{-1}OFx_\alpha = c_1 F^{-1}OFOx_\alpha$$

Now $OF^{-1}OFx_\alpha$ and $F^{-1}OFOx_\alpha$ both have a norm corresponding to unity and are therefore equal.

Theorem 3

For any Gaussian function x, the operators 0 and $F^{-1}OF$ are commutated, giving:

$$OF^{-1}OFx = F^{-1}OFOx$$

Corollary 1

Giving $z_\alpha = OF^{-1}OFx_\alpha$, with $x_\alpha = (2\alpha)^{1/4} e^{-\pi\alpha u^2}$, then $Fz_\alpha = z_{1/\alpha}$.

Demonstration:

$$Fz_\alpha = FF^{-1}OFOx_\alpha = OF^{-1}Ox_\alpha = OF^{-1}OFx_{1/\alpha} = z_{1/\alpha}$$

Remarkable Particular Case $$Fz_1 = z_1$$

This particular function gives perfect symmetry to the time and frequency axes and therefore constitutes the prototype function of the IOTA (isotropic orthogonal transform algorithm) transform. This particular function will be referenced $\Im$.

Corollary 2

Let x be a Gaussian function and $z = OF^{-1}OFx$, then $Oz = Z$.

Demonstration:

$$Oz = OOF^{-1}OFx = OF^{-1}OFx = z$$

Corolary 3

Let x be a Gaussian function and $z = OF^{-1}OFx$, then $F^{-1}OFz = z$.

Demonstration:

$$F^{-1}OFz = F^{-1}OFF^{-1}OFOx = F^{-1}OOFOx = F^{-1}OFOx = z$$

3.3.6 Ambiguity Function of the Functions $z_\alpha$

Let us consider the theorem 2 with the normalization $\tau_0 = \nu_0 = 1/\sqrt{2}$. Then:

$$O_f = O \text{ and } O_f = F^{-1}OF$$

Consequently, the theorem 2 can be rewritten as:
Theorem 4
Let x be a Gaussian function and $z = F^{-1}OFOx$, then:

$$\forall (m,n) \neq (0,0)$$

4. GENERALIZATION TO ANY LATTICES

We have hitherto considered Hilbert bases constructed on an orthogonal lattice with a density 2. This chapter will look at Hilbert bases constructed on any lattice whatever with a density 2.

4.1 General Principles of Construction

In a manner similar to what has been demonstrated for the orthogonal lattices, this paragraph shows the way to build a Hilbert base on any lattice with a density 2 on the basis of a prototype function whose ambiguity function gets canceled on an lattice with a density 1/2.

Let us consider any lattice with a density 2, generated from the base vectors $(\tau_1,\nu_1)$ and $(\tau_2,\nu_2)$, with $|\nu_2\tau_2 - \nu_2\tau_1|1/2$. By convention, the order of base vectors will be chosen such that $\nu_2\tau_1 - \nu_1\tau_2 = 1/2$. We shall consider a function x(t) such that:

$$A_x(2n\tau_1 + 2m\tau_2, 2n\nu_1 + 2m\nu_2) = 0$$

whose ambiguity function gets cancelled therefore on an lattice with a density 1/2.

Let us consider the set of functions $\{x_{m,n}\}$ defined by:

$$x_{m,n}(t) = e^{i\phi_{m,n}} e^{2i\pi(n\nu_1 + m\nu_2)t} x(t - (n\tau_1 + m\tau_2))$$

Let us compute the scalar product $\langle x_{m,n}|x_{m',n'}\rangle$, that is: $\langle x_{m,n}|x_{m',n'}\rangle = e^{i(\phi_{m,n} - \phi_{m',n'})} e^{i\Theta} A_x((n'-n)\tau_1 + (m'-m)\tau_2), (n'-n)\nu_1 + (m'-m)\nu_2)$ with $\Theta = \pi((n-n')\nu_1 + (m-m')\nu_2)((n+n')\tau_1 + (m+m')\tau_2) =$ $$\pi((n^2-n'^2)\nu_1\tau_1 + (m^2-m'^2)\nu_2\tau_2 + 2(mn-m'n')\nu_1\tau_2 + (m-m')(n+n')(\nu_2\tau_1 -$$

Now $\nu_2\tau_1 - \nu_1\tau_2 = 1/2$

Taking $\psi_{m,n} = \pi(n^2\nu_1\tau_1 + m\nu_2\tau_2 + 2mn\nu_1\tau_2)$, we therefore obtain:

$$\Theta = \psi_{m,n} - \psi_{m',n'} + (m-m')(n+n')\pi/2$$

Let $\phi_{m,n} = (m+n)\pi/2 - \psi_{m,n}$. The scalar product $\langle x_{m,n}|x_{m',n'}\rangle_R$ is written finally:

$$Re[e^{i((m+n)-(m'+n')+(m-m')(n+n'))\pi/2} A_x((n'-n)\tau_1 + (m'-m)\tau_2), (n'-n)\nu_1 + (m'-m)\nu_2]$$

The ambiguity function of x being real, we shall look at its coefficient. The same phase term is seen again as in the case of an orthogonal lattice. Consequently, if $(m,n) \neq (m',n')$ modulo 2, the scalar product is zero. If not, it is also zero owing to the hypothesis made on the ambiguity function of x.

We therefore have a general method available for the building of Hilbert bases on any lattices in the time-frequency plane. What remains to be done therefore is to build prototype functions whose ambiguity function has the required property.

4.2 Changing of Coordinates in the Time-frequency Plane

We have already, up to now, encountered operators whose action could be easily interpreted in the time-frequency plane, such as orthogonalization operators which create points of cancellation of the ambiguity function on an orthogonal lattice with a density 1/2. Hereinafter, the description pertains to new operators that make changes of coordinates in the time-frequency plane. These operators enable the conversion of a prototype function, whose ambiguity function gets cancelled on an orthogonal lattice with a density 1/2, into a prototype function whose ambiguity function gets cancelled on any lattice with a density 1/2.

Let us take an operator T which associates, with a function x, the function y=Tx such that:

$$A_y((\tau,v)'M_T)=A_x(\tau,v)$$

$M_T$ being a matrix whose determinant is equal to 1.

The operator T therefore achieves a change in coordinates in the time-frequency plane characterized by the matrix $M_T$.

4.3 Base Operators
4.3.1 Fourier Transform Operator

We have seen here above that if X is the transform of x, namely X=Fx, we have the relationship:

$$A_x(v_2-\tau)=A_x(\tau,v)$$

The corresponding characteristic matrix is then therefore written as:

$$M_F = \begin{bmatrix} 0 & 1 \\ -1 & 0 \end{bmatrix}$$

This matrix corresponds to a rotation by $-\pi/2$ in the time-frequency plane. 4.3.2 Phase Shift Operator Let us consider the phase shift operator $P^\theta$ which associates the function y with a function x such that:

$$y(t)=e^{i\theta}x(t)$$

We obviously have:

$$A_y(\tau,v)=A_x(\tau,v)$$

and therefore $M_{P^{74}} =I$, I being the identity matrix.
4.3.3 Homothetic Transformation Operator The homothetic transformation operator $H_\gamma$ is the operator that associates the function y(t), with a function x(t), the function y(t) being defined by:

$$y(t) = \frac{1}{\sqrt{|\gamma|}} x(t/\gamma)$$

γ being the factor of homothetic transformation considered.

We therefore have:

$$A_y(\tau, v) = \frac{1}{|\gamma|} \int_{-\infty}^{+\infty} x((t+\tau/2)/\gamma)x^*((t+\tau/2)/\gamma)e^{-2i\pi vt}dt$$

Let u=t/γ. If γ is positive:

$$A_y(\tau, v) = \int_{-\infty}^{+\infty} x(u+(\tau/\gamma)/2)x^*(u+(\tau/\gamma)/2)e^{-2ix\gamma vu}du$$

If γ is negative:

$$A_y(\tau, v) = -\int_{+\infty}^{-\infty} x(u+(\tau/\gamma)/2)x^*(u+(\tau/\gamma)/2)e^{-2ix\gamma vu}du$$

In both cases, $A_y(\tau,v)=A_x(\tau/\gamma,\gamma v)$ giving:

$$A_y(\gamma\tau,v/\gamma)=A_x(\tau,v)$$

consequently $$M_{H_\gamma} = \begin{bmatrix} \gamma & 0 \\ 0 & 1/\gamma \end{bmatrix}.$$

4.3.4 Wobbullation Operator

A simple method to modify the ambiguity function of a function consists in multiplying it by a wobbulation signal. $W^\beta$ designates the temporal wobbulation operator that associates the function y(t) with a function x(t), the function y(t) being defined by:

$$y(t)=x(t)e^{i\pi\beta t^2}$$

It is then possible to write:

$$\gamma_y(t,\tau)=y(t+\tau/2)y^*(t-/2)=x(t+\tau/2)x^*(t-\tau/2)e^{2i\pi\beta\tau t}=\gamma_x(t,\tau)e^{2i\pi\beta\tau t}$$

Giving, by Fourier transform $$A_y(\tau,v)=\int\gamma_y(t,\tau)e^{-2i\pi vt}dt=\gamma_x(t,\tau)e^{-2i\pi(v-\beta\tau)t}dt=A_x(\tau,v-\beta\tau)$$

Or again:

$$A_y(\tau,v+\beta\tau)=A_x(\tau,v)$$

consequently $$M_{W^\beta} = \begin{bmatrix} 1 & 0 \\ \beta & 1 \end{bmatrix}.$$

4.4 Group of the Time-frequency Operators

We consider all the operators that may be generated by a finite conjugation of base operators described here above. It is noted first of all that if $y=Tx=T_1T_2 \ldots T_n x$, then we also have:

$$M_T=M_{T_1}M_{T_2}\ldots M_{T_n}$$

Obviously, this set provided with the product defined as the conjugation of the operators possesses a group structure.
4.4.1 Basic Rules for the Multiplication of the Operators The multiplication of the operators is governed by the following rules:

$F^4=I$
$F=H_{-1}$
$P^\theta P^{\theta'}=P^{\theta+\theta'}$
$H_\gamma H_{\gamma'}=H_{\gamma\gamma'}$
$W^\beta W^{\beta'}=W^{\beta+\beta'}$ Furthermore, $F^2$ and $P^\theta$ are commutated with all the other operators. Finally, the following relationships will be noted:

$$H_\gamma Fx(v) = \frac{1}{\sqrt{|\gamma|}} \int x(u)e^{-2i\pi uv/\gamma}du$$

Let U'=y/γ. If γ is positive:

$$H_\gamma Fx(v) = \sqrt{|\gamma|} \int_{-\infty}^{+\infty} x(\gamma u')e^{-2i\pi u'v}du' = FH_{1/\gamma}x(v)$$

If $\gamma$ is negative:

$$H_\gamma Fx(v) = -\sqrt{|\gamma|}\int_{+\infty}^{-\infty} x(\gamma u')e^{-2i\pi u'v}du' = FH_{1/\gamma}x(v)$$

In both cases, we therefore have $H_\gamma F = FH_{1/\gamma}$.
In the same way:

$$H_\gamma W^\beta x(u) = \frac{1}{\sqrt{|\gamma|}}e^{i\pi\beta(u/\gamma)^2}x(u/\gamma) = e^{i\pi(\beta/\gamma^2)u^2}H_\gamma x(u) = W^{\beta/\gamma^2}H_\gamma x(u)$$

We therefore have $H_\gamma W^\beta = W^{\beta/\gamma^2}H_\gamma$.

4.4.2 Extension of the Chirp Transform Algorithm

The above-described rules enable the commutation of all the operators with one another, except for the Fourier transform and the wobbulation operator. The rules enabling the commutation of these operators are more complex and may be extrapolated from the chirp transform algorithm.

Here we consider a relationship binding the operators F, W and H. Let $\delta_t(u)=\delta(u-t)$. Since the operators considered are linear, their properties may be analyzed by considering their action on the distributions $\delta_t$, by virtue of the relationship:

$$x(t)=\int x(u)\delta_t(u)du$$

We have:

$$W^\beta \delta_t(u)=e^{i\pi\beta t^2}\delta_t(u) \rightarrow$$

$$FW^\beta \delta_t(v)=e^{i\pi\beta t^2}e^{-2i\pi v t} \rightarrow$$

$$W^{1/\beta}FW^\beta \delta_t(v)=e^{i\pi\beta t^2}e^{-2i\pi v t}e^{i\pi v^2/\beta}=e^{i\pi\beta(v/\beta-t)^2} \rightarrow$$

$$H_{1/\beta}W^{1/\beta}FW^\beta \delta_t(v)=\sqrt{\beta}e^{i\pi\beta(v-t)^2}=\sqrt{\beta}(W^\beta * \delta_t)(v) = \rightarrow$$

$$FH_{1/\beta}W^{1/\beta}FW^\beta \delta_t(u)=\sqrt{1}W^{-1/\beta}e^{-2i\pi u t} \rightarrow$$

$$W^{1/\beta}FH_{1/\beta}W^{1/\beta}FW^\beta \delta_t(u)=\sqrt{1}e^{-2i\pi u t} \rightarrow$$

$$F^3W^{1/\beta}FH_{1/\beta}W^{1/\beta}FW^\beta \delta_t(v)=\sqrt{1}\delta_t(v) \rightarrow$$

$$FW^{1/\beta}FH_{-1/\beta}W^{1/\beta}FW^\beta = P^{\pi/4}$$

We therefore finally have:

$$FW^{1/\beta}F = P^{\pi/4}W^{-\beta}FW^{-1/\beta}H_\beta$$

4.4.3 Canonical Decomposition

Let us take an element of the set of operators defined here above. If this element has no operator F, it is possible, by using the rules given in 4.4.1, to reduce it into the form:

$$T = P^\theta H_\gamma W^\alpha$$

If this element has only one operator F, it is possible, by applying the same rules, to reduce it into the form:

$$T = P^\theta H_\gamma W^\alpha FW^\beta$$

If this element comprises at least two operators F, it is possible to reduce it into the form:

$$T = P^\theta H_\gamma W^\alpha FW^{\beta_1} \ldots FW^{\beta_n}$$

By applying the rule given in 4.4.2, it is possible to iteratively eliminate the operators F and finally obtain a representation comprising only one operator. In short, the elements of the group can all be written according to one of the two forms of representation given here above.

Let T be an element of the group written according to the first type of representation. Its characteristic matrix is written as follows:

$$M_T = \begin{bmatrix} \gamma & 0 \\ 0 & 1/\gamma \end{bmatrix}\begin{bmatrix} 1 & 0 \\ \alpha & 1 \end{bmatrix} = \begin{bmatrix} \gamma & 0 \\ \alpha/\gamma & 1/\gamma \end{bmatrix}$$

Let T be an element of the group written according to the second type of representation. Its characteristic matrix is written as follows:

$$M_T = \begin{bmatrix} \gamma & 0 \\ 0 & 1/\gamma \end{bmatrix}\begin{bmatrix} 1 & 0 \\ \alpha & 1 \end{bmatrix}\begin{bmatrix} 0 & 1 \\ -1 & 0 \end{bmatrix}\begin{bmatrix} 1 & 0 \\ \beta & 1 \end{bmatrix} = \begin{bmatrix} \beta\gamma & \gamma \\ (\alpha\beta-1)/\gamma & \alpha/\gamma \end{bmatrix}$$

Conversely, take any matrix $M_T$ with a determinant equal to unity. It is then possible to associate with it an operator described according to its canonical representation:

$$M_T = \begin{bmatrix} a & b \\ c & d \end{bmatrix} \text{ with } ad - bc = 1$$

If c=0, it is possible to associate a first type operator with this matrix, with:

$$\begin{cases} \gamma = a \\ \alpha = ab \end{cases}$$

If $c \neq 0$, it is possible to associate a second type of operator with this matrix, with:

$$\begin{cases} \gamma = c \\ \alpha = cd \\ \beta = a/c \end{cases}$$

It may be noted that there will obviously remain a total indeterminacy with regard to $\theta$.

4.5 Construction of a Hilbert Base on any Lattice

The methods that have been described here above give a general method of construction of a Hilbert base on any lattice. Let us consider any lattice with a density 2 generated from the base vectors $(\tau_1, \nu_1)$ and $(\tau_2, \nu_2)$ with $\nu_2\tau_1 - \nu_1\tau_2 = 1/2$. We consider a function $x(t)$ such that:

$$\forall (m,n) \neq (0,0), A_x(n\sqrt{2}, m\sqrt{2}) = 0$$

The function x in practice may be the prototype function of the OQAM, OMSK or any one of the functions obtained by the orthogonalization of Gaussian functions as indicated in Chapter 3 and especially the IOTA function.

Let T be an operator with a characteristic matrix $M_T$ defined by:

$$\sqrt{2}\begin{bmatrix} \tau_1 & \tau_2 \\ \nu_1 & \nu_2 \end{bmatrix}$$

and y=Tx. Then, $\forall (m,n) \neq (0,0)$:

$$A_y(2n\tau_1 + 2m\tau_2, 2n\nu_1 + 2m\nu_2) = A_y((n\sqrt{2}, m\sqrt{2})^t M_T) = A_x(n\sqrt{2}, m\sqrt{2}) = (0,0)$$

Let us consider the set of functions $\{y_{m,n}\}$ defined by:

$$y_{m,n}(t)=e^{i\phi_{m,n}}e^{2i\pi(n\nu_1+m\nu_2)t}y(t-(n\tau_1+m\tau_2))$$

with $\phi_{m,n}=(m+n)\pi/2-\pi(n^2\nu_1\tau_1+m^2\nu_2\tau_2+2mn\nu_1\tau_2)$

In accordance with what has been demonstrated in 4.1., the set of the functions $\{y_{m,n}\}$ constitutes a Hilbert base. There is therefore have a general method available to construct Hilbert bases on any lattices in a time-frequency plane.

5. QUINCUNXIAL CONSTRUCTION OF HILBERT BASES

Although the general method described here above is of obvious academic interest, its practical application reveals certain difficulties. On the one hand, in the general case, the demodulation algorithms are seriously complicated by the oblique structure of the lattice of the basic functions. Furthermore, the prototype function obtained is generally complex. This further increases the complexity.

It may therefore legitimately be asked if this generalization has any practical value. The object of this program is to provide a complete answer to this question.

Let us consider the set of Hilbert bases generated according to the method explained here above. A search is made, within this set, for the Hilbert bases whose prototype function is a real even-parity function. The ambiguity function then has the following symmetries:

$$A_x(\tau,\nu)=\int e^{-2i\pi\nu t}x(t+\tau/2)x^*(t-\tau/2)dt=\int e^{-2i\pi\nu t}x(t-\tau/2)x^*(t+\tau/2)dt=A_x(-\tau,\nu)$$

and $$A_x(\tau,\nu)=\int e^{-2i\pi\nu t}x(t+\tau/2)x^*(t-\tau/2)dt=\int e^{2i\pi\nu t}x^*(t+\tau/2)x(t-\tau/2)dt=A_x(-\tau,-\nu)$$

We therefore have $A_x(\tau,\nu)=A_x(-\tau,\nu)=A_x(-\tau,-\nu)=A_x(-\tau,\nu)$. These symmetries of the ambiguity function cannot be obtained unless the cancellation lattice of this function has the same symmetries. Now these conditions are not verified except for two types of lattice: the orthogonal lattice on which are based all the modulations considered up till now and the quincunxial lattice.

The orthogonal lattice is generated by the base vectors $(\tau_1,\nu_1)=(1/\sqrt{2},0)$ and $(\tau_2,\nu_2)=(0,1/\sqrt{2})$. The quincunxial lattice, generated by the vectors $(\tau_1,\nu_1)=(1/2,-1/2)$ and $(\tau_2,\nu_2)=(1/2,1/2)$. There is a passage from one lattice to the other by a rotation by an angle $-\pi/4$. This is why a special value is attached here below to the operators that achieve a rotation in the time-frequency plane.

5.1 Sub-group of the Time-frequency Rotation Operators

We shall consider all the operators whose characteristic matrix is a rotation in the time-frequency plane:

$$M_T = \begin{bmatrix} \cos\varphi & -\sin\varphi \\ \sin\varphi & \cos\varphi \end{bmatrix}$$

It has already been seen that the operator of the Fourier transform F corresponds to a rotation by an angle $\phi=-\pi/2$ while the operator $F^3=F^{-1}$ corresponds to a rotation by an angle $\phi=\pi/2$.

Let us consider an operator with the form:

$$P^\theta F W^\alpha H_\gamma F W^\beta$$

Its characteristic matrix is written as follows:

$$M_T = \begin{bmatrix} 0 & 1 \\ -1 & 0 \end{bmatrix}\begin{bmatrix} 1 & 0 \\ \alpha & 1 \end{bmatrix}\begin{bmatrix} \gamma & 0 \\ 0 & 1/\gamma \end{bmatrix}\begin{bmatrix} 0 & 1 \\ -1 & 0 \end{bmatrix}\begin{bmatrix} 1 & 0 \\ \beta & 1 \end{bmatrix} = \begin{bmatrix} \alpha\beta\gamma-1/\gamma & \alpha\gamma \\ -\beta\gamma & -\gamma \end{bmatrix}$$

If we take $\gamma=-\cos\phi$ and $\alpha=\beta=\tan\phi$, we obtain a matrix of rotation by an angle $\phi$. The parameter $\theta$ remains indeterminate. To remove this indeterminacy, it will be laid down that this operator will leave the Gaussian function $x(u)=e^{-\pi u^2}$ invariant, that is:

$$W^{tg\varphi}x(u) = e^{-\pi(1-itg\varphi)u^2} \Rightarrow$$

$$FW^{tg\varphi}x(\nu) = \frac{1}{\sqrt{1-itg\varphi}}e^{-\pi\nu^2/(1-itg\varphi)} \Rightarrow$$

$$H_{-\cos\varphi}FW^{tg\varphi}x(\nu) = \frac{1}{\sqrt{(1-itg\varphi)|\cos\varphi|}}e^{-\pi\nu^2/((1-itg\varphi)\cos^2\varphi)}$$

$$W^{tg\varphi}H_{-\cos\varphi}FW^{tg\varphi}x(\nu) = \frac{1}{\sqrt{(1-itg\varphi)|\cos\varphi|}}e^{-\pi\nu^2/((1-itg\varphi)\cos^2\varphi)}e^{i\pi\nu^2 tg\varphi}$$

Now $\frac{1}{(\cos^2\varphi)(1-itg\varphi)} - itg\varphi = \frac{1+itg\varphi}{(\cos^2\varphi)(1+tg^2\varphi)} - itg\varphi = 1 \Rightarrow$ $$W^{tg\varphi}H_{-\cos\varphi}FW^{tg\varphi}x(\nu) = \frac{1}{\sqrt{(1-itg\varphi)|\cos\varphi|}}e^{-\pi\nu^2}$$

$$FW^{tg\varphi}H_{-\cos\varphi}FW^{tg\varphi}x(u) = \frac{1}{\sqrt{(1-itg\varphi)|\cos\varphi|}}e^{-\pi u^2}$$

The term $\phi_{modx}$ designates the value between $-\pi/2$ and $\pi/2$ which is said to be congruent with $\phi$ modulo $\pi$. We can therefore write:

$$\frac{1}{\sqrt{(1-itg\varphi)|\cos\varphi|}} = \frac{1}{\sqrt{(1-itg\varphi_{mod\pi})\cos\varphi_{mod\pi}}} = e^{i\varphi_{mod\pi}/2}$$

Finally, we can write:

$$P^{-\phi_{modx}/2}FW^{tg\phi}H_{-\cos\phi}FW^{tg\phi}x(u)=x(u)$$

Definition

The term $R^\phi$ denotes the operator of rotation in the time-frequency plane by an angle $\phi$ defined by:

$$R^\varphi = \begin{cases} F & \text{si } \varphi \equiv -\pi/2 \text{ modulo } 2\pi \\ F^{-1} & \text{si } \varphi \equiv \pi/2 \text{ modulo } 2\pi \\ P^{-\varphi_{mod\pi}/2}FW^{tg\varphi}H_{-\cos\varphi}FW^{tg\varphi} & \text{if not} \end{cases}$$

Take a real number $\alpha$. The fractional power of the operator F is also defined by the relationship:

$$F^\alpha = R^{-\alpha\pi/2}$$

The set of operators thus defined possesses a commutative group structure isomorphous with the group of the rotations of the plane. The exponent notation of the operator F verifies all the "usual" properties of an exponent.

5.2 IOTA $\pi/4$

Let us consider an even-parity real prototype function x(t) enabling the generation of a Hilbert base on the orthogonal lattice, and the function y(t) defined by:

$$y=F^{1/2}x$$

where $F^{1/2}$ is the square root operator of the Fourier transform as defined here above. At the level of the ambiguity functions, this operator performs a rotation by an angle $-\pi/4$ in the time-frequency plane. In order that the function y(x) may be a real even-parity function, its ambiguity function should have a symmetry with respect to the time and frequency axes. This means therefore that the function x(t), in addition to the symmetry with respect to the time and frequency axes, has a symmetry with respect to the diagonals of the time-frequency plane. A property such as this can be verified only if the function x(t) is identical to its Fourier transform. Now we know only one function having this property. This is the IOTA function.

The IOTA function $\pi/4$ is defined by the relationship:

$$\Im^{\pi/4} = F^{1/2}\Im$$

This function is a real and even-parity function by construction. The ambiguity function of this function is cancelled therefore on the quincunxial lattice generated by the vectors $(\tau_1,\nu_1)=(1/2,-1/2)$ and $(\tau_2,\nu_2)=(1/2,1/2)$. According to 4.1, it is deduced therefrom that the set of the functions $\Im_{m,n}^{\pi/4}$ defined by:

$$\Im_{m,n}^{\pi/4}(t) = e^{i\phi_{m,n}} e^{i\pi(m+n)t} \Im^{\pi/4}(t-(m-n)/2)$$

with $\phi_{m,n} = (m+n-mn-(m^2-n^2)/2)\pi/2$ constitutes a Hilbert base.

In redefining the indices, it is possible to rewrite the definition of this set as follows:

$$\Im_{m,n}^{\pi/4}(t) = e^{i\phi_{m,n}} e^{i\pi mt} \Im^{\pi/4}(t-n/2), \ m+n \text{ even parity}$$

with $\phi_{m,n} = (m-mn/2+(n^2-m^2)/4)\pi/2$

6. APPENDIX

The following identity will be noted:

$$(u-a)^2 + (u-b)^2 = 2u^2 - 2au - 2bu + a^2 + b^2 =$$

$$2\left[u^2 - au - bu + \left(\frac{a+b}{2}\right)^2 + \left(\frac{a-b}{2}\right)^2\right] = 2\left[\left(u - \frac{a+b}{2}\right)^2 + \left(\frac{a-b}{2}\right)^2\right]$$

Let us take a normalized Gaussian function x defined by:

$$x(u) = (2\alpha)^{1/4} e^{-\pi\alpha u^2}$$

The product $x(u-a)x(u-b)$ can therefore be written as follows:

$$x(u-a)x(u-b) = \sqrt{2\alpha}\, e^{-\pi\alpha((u-a)^2+(u-b)^2)} = \sqrt{2\alpha}\, e^{-2\left(\pi\alpha\left(u-\frac{a+b}{2}\right)\right)^2} e^{-2\left(\pi\alpha\left(\frac{a-b}{2}\right)\right)^2}$$

Finally it is possible to write:

$$x(u-a)x(u-b) = e^{-\pi(\alpha(a-b))^2/2} \left\| x\left(u - \left(\frac{a+b}{2}\right)\right) \right\|^2$$

APPENDIX 4

1. FROM THE CONTINUOUS TO THE DISCRETE

In the above two chapters, we have considered functions of $L^2[R]$. In practice, the digital processing of the signals assumes that there is a passage into the discrete domain.

1.1 General Points

The signals used in practice are always considered to be limited both in the temporal domain and in the frequency domain although this assumption is a well-known theoretical impossibility. It is possible however to circumvent this obstacle and represent signals by a finite set of discrete values in applying the following method:

Let it be assumed that we are looking at an unspecified complex signal x(t) in a space limited to [0,T] in the temporal domain and to [$-W/2,W/2$] in the frequency domain. The examination shall be limited to the case where the product WT is an integer. It is possible to associate, which this signal, a vector $\underline{x}$ having coordinates $x_p$ with:

$$x_p = \sum_{q=-\infty}^{+\infty} x(p/W + qT), \ p \text{ variant de } 0 \text{ à } WT-1$$

The summation according to the index q achieves a temporal aliasing and therefore "periodizes" the signal in time while the sampling "periodizes" the signal in frequency.

Let $y(t) = x(t) e^{2i\pi mt/T}$

We can write:

$$y_p = \sum_{q=-\infty}^{+\infty} y(p/W + qT) = \sum_{q=-\infty}^{+\infty} e^{2i\pi m(p/W+qT)/T} x(p/W + qT) =$$

$$e^{2i\pi mp/WT} \sum_{q=-\infty}^{+\infty} x(p/W + qT) = e^{2i\pi mp/WT} x_p$$

It will be noted that this perfectly <<natural>> result is obtained only at the price of a particular choice of the modulation frequency, which eliminates all the problems of aliasing. Similarly, if we consider a translation of the type $y(t)=x(t-n/W)$, we can write:

$$y_p = \sum_{q=-\infty}^{+\infty} y(p/W + qT) = \sum_{q=-\infty}^{+\infty} x((p-n)/W + qT) =$$

$$\sum_{q=-\infty}^{+\infty} x((p-n)\bmod WT / W + qT) = x_{(p-n)\bmod WT}$$

In general, the choice of temporal and frequency sampling structures which are respectively multiples of $1/W$ and $1/T$ ensures a harmonious aliasing of the signals and enables writing in the discrete domain that is directly equivalent to that of the continuous domain.

Finally, let us consider the scalar product of two vectors $\underline{x}$ and $\underline{y}$. It is possible to write:

$$\langle \underline{x} | \underline{y} \rangle = \sum_{n=0}^{WT-1} x_n y_a^* = \sum_{n=0}^{WT-1} \sum_{q'=-\infty}^{+\infty} x(n/W + q'T) \sum_{q''=-\infty}^{+\infty} y^*(n/W + q''T)$$

Let $p = n + q'WT$ and $q = q' - q''$ $$\langle \underline{x} | \underline{y} \rangle = \sum_{p=-\infty}^{+\infty} x(p/W) \sum_{q=-\infty}^{+\infty} y^*(p/W - qT) =$$

-continued $$\sum_{q=-\infty}^{+\infty} \int_{-\infty}^{+\infty} x(t) y^*(t-qT) \sum_{p=-\infty}^{+\infty} \delta(t-p/W) dt$$

Now $\sum_{p=-\infty}^{+\infty} \delta(t-p/W) = W \sum_{p=-\infty}^{+\infty} e^{-2i\pi pWT} \Rightarrow$ $$\langle \bar{x} | \bar{y} \rangle = W \sum_{p=-\infty}^{+\infty} \sum_{q=-\infty}^{+\infty} \int_{-\infty}^{+\infty} x(t) y^*(t-qT) e^{-2i\pi pWt} dt$$

1.2 The IOTA Transform

Here we shall look at a first transform deriving results obtained in the chapter on "theoretical approach" and based on the IOTA function.

1.2.1 The IOTA Transform in the Continuous Domain

The transform considered here is a normalized transform, namely one built on the basis of the $(n/\sqrt{2}, m/\sqrt{2})$ type lattice described here above. It is always possible to return to this situation by the preliminary action of the appropriate homothetic operator. Let us take the Hilbert base $\{\Im_{m,n}\}$ defined by:

$$\Im_{m,n}(t) = e^{i\varphi_{m,n}} e^{\sqrt{2} i\pi mt} \Im\left(t - \frac{n}{\sqrt{2}}\right)$$

with $\phi_{m,n} = (m+n)\pi/2$.

It will be noted that it is possible alternately to chose the following formulation:

$$\begin{cases} \varphi_{m,n} = 0 & \text{if } m+n \text{ even parity} \\ \varphi_{m,n} = \pi/2 & \text{if } m+n \text{ odd parity} \end{cases}$$

This modification corresponding to a possible sign reversal of the base functions. The IOTA transform of a Fourier transform S(f) signal s(t) is then defined by the relationships:

$$a_{m,n} = \operatorname{Re} \int s(t) \Im_{m,n}^* dt = \operatorname{Re} \int s(t) e^{-i\varphi_{m,n}} e^{-\sqrt{2} i\pi mt} \Im\left(t - \frac{n}{\sqrt{2}}\right) dt =$$

$$(-1)^{mn} \operatorname{Re} \int s(f) e^{-i\varphi_{m,n}} e^{\sqrt{2} i\pi nf} \Im\left(f - \frac{m}{\sqrt{2}}\right) df$$

The reverse transforms being given by:

$$s(t) = \sum_{m,n} a_{m,n} \Im_{m,n}(t) = \sum_{m,n} a_{m,n} e^{i\phi_{m,n}} e^{\sqrt{2} i\pi mt} \Im\left(t - \frac{n}{\sqrt{2}}\right)$$

$$S(f) = \sum_{m,n} (-1)^{mn} a_{m,n} e^{i\varphi_{m,n}} e^{-\sqrt{2} i\pi nf} \Im\left(f - \frac{m}{\sqrt{2}}\right)$$

1.2.2 The Discrete IOTA Transform

Let us chose T equal to $N\sqrt{2}$ and W equal to $M\sqrt{2}$. This choice guarantees the absence of problems of aliasing. Let us consider a base function $\Im_{m,n}$. It is possible to associate with it the vector $\vec{\Im}_{m,n}$ having coordinates $\Im_{m,n}$ with:

$$\Im_{m,n,p} = \sum_{q=-\infty}^{+\infty} \Im_{m,n}(p/W + qT) =$$

$$\sum_{q=-\infty}^{+\infty} e^{i\varphi_{m,n}} e^{\sqrt{2} i\pi m(p/W+qT)} \Im\left(p/W + qT - \frac{n}{\sqrt{2}}\right) =$$

$$e^{i\varphi_{m,n}} e^{i\pi mp/M} \sum_{q=-\infty}^{+\infty} \Im\left(\frac{p-nM}{W} + qT\right) = e^{i\varphi_{m,n}} e^{i\pi mp/M} \Im_{p-nM}$$

Let us take a scalar product of the type: $\langle \vec{\Im}_{m,n} | \vec{\Im}_{m',n'} \rangle_R$.

Given the properties of orthogonality of the time-frequency translated functions of the function IOTA, this scalar product is zero if $(m,n) \neq (m',n') \mod (2M, 2N)$. With regard to the norm of the vectors $\vec{\Im}_{m,n}$, we can write:

$$\langle \vec{\Im}_{m,n} | \vec{\Im}_{m,n} \rangle_R =$$

$$\langle \vec{\Im}_{m,n} | \vec{\Im}_{m,n} \rangle = W \sum_{p=-\infty}^{+\infty} \sum_{q=-\infty}^{+\infty} \int_{-\infty}^{+\infty} \Im_{m,n}(t) \Im_{m,n}^*(t-qT) e^{-2i\pi pWt} dt =$$

$$W \sum_{p=-\infty}^{+\infty} \sum_{q=-\infty}^{+\infty} \int_{-\infty}^{+\infty} \Im_{m,n}(t+qT/2) \Im_{m,n}^*(t-qT/2) e^{-2i\pi pWt} dt =$$

$$W \sum_{p=-\infty}^{+\infty} \sum_{q=-\infty}^{+\infty} A_{\Im_{m,n}}(qT, pW) =$$

$$W A_{\Im_{m,n}}(0,0) = W A_{\Im}(0,0) = M\sqrt{2}$$

Given these observations, the discrete IOTA transform can be aennea as follows:

Definition of the IOTA Transform

Let M and N be any two integers. Let us consider 4MN vectors with a dimension 2MN that are orthogonal in the sense of the real scalar product, and defined as follows:

$$\Im_{m,n,p} = e^{i\phi_{m,n}} e^{i\pi mp/M} \Im_{p-nM}$$

m varying from 0 to 2M−1, n from 0 to 2N−1 and p from 0 to 2MN−1.

Let $\bar{s}$ be a complex vector with a dimension 2MN. It can be broken down as follows:

$$s_p = \sum_{m=0}^{2M-1} \sum_{n=0}^{2N-1} a_{m,n} \Im_{m,n,p},$$

p varying from 0 to 2MN−1, with:

$$a_{m,n} = \frac{1}{M\sqrt{2}} \operatorname{Re}\left[\sum_{p=0}^{2MN-1} s_p \Im_{m,n,p}^*\right]$$

The matrix $\{a_{m,n}\}$ is the IOTA transform of the vector $\bar{s}$.

1.3 The IOTA Transform π/4

1.3.1 The IOTA Transform π/4 in the Continuous Domain

The transform considered here is a <<normalized>> transform, namely one built on the basis of the quincunxial type normalized lattice described here above. It is always possible to return to this situation by the preliminary action of the appropriate homothetic operator. Let us take the Hilbert base $\{\Im_{m,n}^{\pi/4}\}$ defined by:

$$\Im_{m,n}^{\pi/4}(t)=e^{i\phi_{m,n}}e^{i\pi mt}\Im^{\pi/4}(t-n/2),\ m+n\ \text{even parity}$$

with $\phi_{m,n}=(n-mn/2+(n^2-m^2)/4)\pi/2$

It can easily be noted that it is possible alternately to chose the following formulation:

$$\begin{cases} \varphi_{m,n} = 0 & \text{if } m+n \equiv 0 \text{ modulo } 4, m \text{ and } n \text{ even parity} \\ \varphi_{m,n} = \pi/4 & \text{if } m+n \equiv 2 \text{ modulo } 4, m \text{ and } n \text{ odd parity} \\ \varphi_{m,n} = \pi/2 & \text{if } m+n \equiv 2 \text{ modulo } 4, m \text{ and } n \text{ even parity} \\ \varphi_{m,n} = 3\pi/4 & \text{if } m+n \equiv 0 \text{ modulo } 4, m \text{ and } n \text{ odd parity} \end{cases}$$

this modification corresponding to a possible sign reversal of the base functions. The IOTA transform $\pi/4$ of a Fourier transform $S(f)$ signal $s(t)$ is then defined by the relationships:

$$a_{m,n}=Re[\int s(t)\Im_{m,n}^{\pi/4*}dt]=Re[\int s(t)e^{-i\phi_{m,n}}e^{-i\pi mt}\Im^{\pi/4}(t-n/2)dt]=Re[i^{-mn}\int S(f)e^{-i\phi_{m,n}}e^{i\pi nf}\Im^{\pi/4}(f-m/2)df]$$

The reverse transforms being given by:

$$s(t) = \sum_{m,n} a_{m,n}\Im_{m,n}^{\pi/4}(t) = \sum_{m,n} a_{m,n}e^{i\phi_{m,n}}e^{i\pi mt}\Im^{\pi/4}(t-n/2)$$

$$S(f) = \sum_{m,n} i^{mn}a_{m,n}e^{i\varphi_{m,n}}e^{-i\pi nf}\Im^{\pi/4}(f-m/2)$$

1.3.2 The Discrete IOTA Transform

Let us chose T equal to 2N and W equal to 2M. This choice guarantees the absence of problems of aliasing. Let us consider a base function $\Im_{m,n}^{\pi/4}$. It is possible to associate with it the vector $\vec{\Im}_{m,n}^{\pi/4}$ having coordinates $\Im_{m,n,p}^{\pi/4}$ with:

$$\Im_{m,n,p}^{\pi/4} = \sum_{q=-\infty}^{+\infty} \Im_{m,n}^{\pi/4}(p/W+qT) = \sum_{q=-\infty}^{+\infty} e^{i\phi_{m,n}}e^{i\pi m(p/W+qT)}\Im^{\pi/4}(p/W+qT-n/2) =$$

$$e^{i\phi_{m,n}}e^{i\pi mp/2M}\sum_{q=-\infty}^{+\infty}\Im^{\pi/4}\left(\frac{p-nM}{W}+qT\right) = e^{i\phi_{m,n}}e^{i\pi mp/2M}\Im_{p-nM}^{\pi/4}$$

Let us take a scalar product of the type: $<\vec{\Im}_{m,n}^{\pi/4} | \vec{\Im}_{m',n'}^{\pi/4}>_R$.

Given the properties of orthogonality of the time-frequency translated functions of the function IOTA, this scalar product is zero if $(m,n)\neq(m',n')$ mod $(2M,2N)$. With regard to the norm of the vectors $\vec{\Im}_{m,n}^{\pi/4}$, we can write:

$$\langle \Im_{m,n}^{\pi/4} | \Im_{m,n}^{\pi/4} \rangle = W \sum_{p=-\infty}^{+\infty}\sum_{q=-\infty}^{+\infty}\int_{-\infty}^{+\infty}\Im_{m,n}^{\pi/4}(t)\Im_{m,n}^{\pi/4*}(t-qT)e^{-2i\pi pWt}dt =$$

$$W \sum_{p=-\infty}^{+\infty}\sum_{q=-\infty}^{+\infty}\int_{-\infty}^{+\infty}\Im_{m,n}^{\pi/4}(t+qT/2)\Im_{m,n}^{\pi/4*}(t-qT/2)e^{-2i\pi pWt}dt =$$

$$W \sum_{p=-\infty}^{+\infty}\sum_{q=-\infty}^{+\infty}A_{\Im_{m,n}^{\pi/4}}(qT,pW) = WA_{\Im^{\pi/4}}(0,0) = WA_{\Im^{\pi/4}}(0,0) = 2M$$

Given these observations, the discrete $\pi/4$ IOTA transform can be defined as follows:

Definition

Let M and N be two unspecified integers. Let us consider 8MN vectors with a dimension 4MN that are orthogonal in the sense of the real scalar product, and defined as follows:

$$\Im_{m,n,p}^{\pi/4}=e^{i\phi_{m,n}}e^{i\pi mp/2M}\Im_{p-nM}$$

m varying from 0 to 4M−1, n from 0 to 4N−1 with m+n as an even-parity value and p varying from 0 to 4MN−1.

Let $\vec{e}$ be a complex vector with a dimension 4MN. It can be broken down as follows:

$$s_p = \sum_{m=0}^{4M-1}\sum_{\substack{n=0 \\ m+n\text{ pair}}}^{4N-1} a_{m,n}\Im_{m,n,p}^{\pi/4},$$

p varying from 0 to 4MN−1, with:

$$a_{m,n} = \frac{1}{2M}Re\left[\sum_{p=0}^{4MN-1} s_p \Im_{m,n,p}^{\pi/4 *}\right]$$

The matrix $\{a_{m,n}\}$ is the IOTA transform of the vector $\vec{e}$.

2. THE FAST DEMODULATION ALGORITHMS 2.1 Demodulation by Fast IOTA Transform

We consider an IOTA multicarrier type modulation characterized by the equation of the signal sent:

$$s(t) = \sum_{m,n} a_{m,n}\Im_{m,n}(t)$$

Let us take a transmission channel characterized by its variable transfer function $T(f,t)$. The signal received $r(t)$ is written as follows:

$$r(t)=\int S(f)T(f,t)e^{2i\pi ft}df$$

The optimal demodulator estimates the transfer function $T(f,t)$ by means that are not described at this stage. To demodulate the signal proper, the channel is locally likened to a multiplier channel characterized by an amplitude and phase corresponding to the value of $T(f,t)$ for the instant and frequency considered. To estimate amen, the signal received is therefore likened to the signal:

$$\tilde{r}(t)=\int S(f)T(m/\sqrt{2},n/\sqrt{2})e^{2i\pi ft}df=T(m/\sqrt{2},n/\sqrt{2})s(t)$$

We assume $$T(m/\sqrt{2},n/\sqrt{2})=\rho_{m,n}e^{i\theta_{m,n}}$$

The demodulator therefore performs the following processing operation:

$$\tilde{a}_{m,n}=Re\int r(t)e^{-i\theta_{m,n}}\Im_{m,n}^{*}(t)dt$$

In the case of a stationary channel with a transfer function $\rho e^{-\theta}$, we obviously find:

$$\tilde{a}_{m,n}=\rho a_{m,n}$$

In practice, the processing is done in digital form. We obtain:

$$\tilde{a}_{m,n} = \frac{1}{M\sqrt{2}}Re\left[\sum_{p=0}^{2MN-1} r_p e^{-i\theta_{m,n}}\Im_{m,n,p}^{*}\right] =$$

-continued $$\tilde{a}_{m,n} = \frac{1}{M\sqrt{2}} \text{Re}\left[e^{-i(\varphi_{m,n}+\theta_{m,n})} \sum_{p=0}^{2MN-1} e^{-i\pi p/M} r_p \mathfrak{I}_{p-nM}\right]$$

We then assume that p=k+2Mr, k varying from 0 to 2M−1 and r from 0 to N−1:

$$\tilde{a}_{m,n} = \frac{1}{M\sqrt{2}} \text{Re}\left[e^{-i(\varphi_{m,n}+\theta_{m,n})} \sum_{k=0}^{2M-1} e^{-i\pi mk/M} \sum_{r=0}^{N-1} r_{k+2Mr} \mathfrak{I}_{k+(2r-n)M}\right]$$

This equation shows that it is possible to use a fast demodulation algorithm comprising the following processing operations:

the prefiltering of the signal received by the prototype function the aliasing of the filtered waveform modulo 2M FFT with a dimension of 2M complex points the correction of the phase $\theta_{m,n}+\phi_{m,n}$ the selection of the real part.

This algorithm therefore enables the overall computation of all the coefficients of a given index n. The magnitude of the corresponding complexity is approximately double that of the algorithm used for the OFDM.

2.2 Demodulation by Fast π/4 IOTA Transform

We consider a π/4 IOTA multicarrier type modulation characterized by the equation of the signal sent:

$$s(t) = \sum_{m,n} a_{m,n} \mathfrak{I}^{\pi/4}_{m,n}(t), \quad m+n \text{ even parity}$$

As above, the demodulator performs the following processing operation:

$$\tilde{a}_{m,n} = \text{Re}\int r(t)e^{-i\theta_{m,n}}\mathfrak{I}^{\pi/4*}_{m,n}(t)dt$$

In practice, the processing is done in digital form. We obtain:

$$\tilde{a}_{m,n} = \frac{1}{2M}\text{Re}\left[\sum_{p=0}^{4MN-1} r_p e^{-i\theta_{m,n}} \mathfrak{I}^{\pi/4*}_{m,n,p}\right] =$$

$$\frac{1}{2M}\text{Re}\left[e^{-i(\varphi_{m,n}+\theta_{m,n})} \sum_{p=0}^{4MN-1} e^{-i\pi mp/2M} r_p \mathfrak{I}^{\pi/4}_{p-nM}\right]$$

We then assume that p=k+4Mr, k varying from 0 to 4M−1 and r from 0 to N−1:

$$\tilde{a}_{m,n} = \frac{1}{2M}\text{Re}\left[e^{-i(\varphi_{m,n}+\theta_{m,n})} \sum_{k=0}^{4M-1} e^{-i\pi mk/2M} \sum_{r=0}^{N-1} r_{k+2Mr} \mathfrak{I}^{\pi/4}_{k+(4r-n)M}\right]$$

This equation shows that it is possible to use a fast demodulation algorithm comprising the following processing operations:

the prefiltering of the signal received by the prototype function $\mathfrak{I}^{\pi/4}$ the aliasing of the filtered waveform modulo 4M FFT with a dimension of 4M complex points. In practice, it is enough to compute the even parity and odd parity points according to the parity of n. This partial FFT is done by decimating the samples by a ratio of 2 after the first bank of butterflies. This is equivalent to a simple complementary prefiltering (sum or difference of samples). The operation is then reduced to an FFT with a dimension of 2M points.

correction of the phase $\theta_{m,n}+\phi_{m,n}$ selection of the real part

This algorithm therefore enables the overall computation of all the coefficients with a given index n. The scale of the corresponding complexity is approximately double that of the algorithm used for the OFDM.

What is claimed is:

1. Multicarrier signal designed to be transmitted to digital receivers, especially in a non-stationary transmission channel, corresponding to the frequency multiplexing of several elementary carriers each corresponding to a series of symbols, characterized in that the multicarrier signal is built on a non-orthogonal time-frequency lattice with a density 2.

2. Signal according to claim 1 in which, each symbol being assigned to a carrier during a symbol time $\tau_0$ and the spacing between two neighboring carriers being equal to $v_0$, said frequency-time lattice is a quincunxial lattice, in which:

said symbol time $\tau_0$ is equal to a quarter of the inverse of said spacing $v_0$ between two neighboring carriers, two consecutive symbols sent out on one and the same carrier are spaced out by two symbol times $\tau_0$; and the symbols sent out on adjacent carriers are offset by the symbol time $\tau_0$.

3. Signal according to claim 1, characterized in that each of said carriers undergoes a filtering operation for the shaping of its spectrum, chosen so that each symbol element is highly concentrated both in the temporal field and the frequency field.

4. Signal according to claim 2, characterized in that its complex envelope meets the following equation:

$$s(t) = \sum_{m+n \text{ even}} a_{m,n} x_{m,n}(t)$$

where:

$a_{m,n}$ is a real coefficient representing the source signal, chosen in a predetermined alphabet of modulation;

m is an integer representing the frequency dimension;

n is an integer representing the temporal dimension;

t represents time;

$x_{m,n}(t)$ is a basis function translated into the time-frequency space of one and the same even-parity prototype function x(t) taking real or complex values, namely:

$$x_{m,n}(t)=e^{i\phi_{m,n}}e^{i(2\pi m v_0 t+\phi)}x(t-n\tau_0) \text{ with } v_0\tau_0=1/2$$

with $\phi_{m,n}=(m+n+mn+(n^2-m^2)/2)\pi/2$ where φ is an arbitrary phase parameter, and where said basic functions $\{x_{m,n}\}$ are mutually orthogonal, the real part of the scalar product of two different basic functions being zero.

5. Signal according to claim 4, characterized in that said prototype function x(t) corresponding to a 45° rotation in the time-frequency plane of a prototype function enables the definition of a Hilbert base on an orthogonal time-frequency lattice with a density 1/2.

6. Signal according to claim 4, characterized in that said prototype function x(t) is obtained by the application of the operator $F^{1/2}$; corresponding to the square root of a Fourier transform on said prototype function enabling the definition of a Hilbert base on an orthogonal time-frequency lattice with a density 1/2.

7. Signal according to claim 5, characterized in that said prototype function x(t) is a function identical to its Fourier transform.

8. Signal according to claim 7, characterized in that said prototype function x(t) is the prototype function $\Im$.

9. Method for the transmission of a digital signal, especially in a non-stationary transmission channel, characterized in that it comprises the following steps:

the channel encoding of a digital signal to be transmitted, delivering real digital coefficients $a_{m,n}$ chosen out of a predetermined alphabet;

the building of a signal s(t) meeting the following equation:

$$s(t)=\Sigma a_{m,n} x_{m,n}(t) \quad m+n \text{ even}$$

where:

m is an integer representing the frequency dimension;
n is an integer representing the temporal dimension;
t represents time;
$x_{m,n}(t)$ is a basic function translated into the time-frequency space of one and the same even-parity prototype function x(t) taking real or complex values, namely:

$$x_{m,n}(t)=e^{i\phi_{m,n}}e^{i(2\pi m v_0 \tau + \phi)}x(t-n\tau_0) \text{ with } v_0\tau_0=1/2$$

where $\phi$ is an arbitrary phase parameter,
said basic functions $\{x_{m,n}\}$ being mutually orthogonal, the real part of the scalar product of two different basic functions being zero, the transmission of a signal, having said signal s(t) as its complex envelope, to at least one receiver.

10. Method according to claim 9, characterized in that it comprises a step of frequency and/or time interlacing applied to the binary elements forming said digital signal to be transmitted or to the digital coefficients $a_{m,n}$.

11. Method for the reception of a signal s(t) according to claim 1, characterized in that it comprises the following steps:

the reception of a signal having, as its complex envelope, a signal r(t) corresponding to the signal s(t) at transmission;

the estimation of the response of the transmission channel comprising an estimation of the phase response $\theta_{m,n}$ and the amplitude response $\rho_{m,n}$;

the demodulation of said signal r(t) comprising the following steps:
  the multiplication of said signal r(t) by the prototype function x(t);
  the aliasing of the filtered waveform modulo $2\tau_0$;
  the application of a Fourier transform [(FFT)];
  the selection of the samples for which m+n is an even-parity value;
  the correction of the phase $\theta_{m,n}$ induced by the transmission channel;
  the correction of the phase corresponding to the term $e^{\phi_{i_{m,n}}}$;
  the selection of the real part of the coefficient obtained $\tilde{a}_{m,n}$ corresponding to the transmitted coefficient $a_{m,n}$ weighted by the amplitude response $\rho_{m,n}$ of the transmission channel.

12. Method according to claim 1, characterized in that it comprises at least one of the following steps:

the frequency and/or time de-interlacing of said real digital coefficients $\tilde{a}_{m,n}$ and, possibly, of the corresponding values $\rho_{m,n}$ of the amplitude response of the channel, said de-interlacing being symmetrical to an interlacing implemented at transmission;

a step of weighted-decision decoding that is adapted to the channel encoding implemented at transmission.

13. Signal according to claim 2, characterized in that each of said carriers undergoes a filtering operation for the shaping of its spectrum, chosen so that each symbol element is highly concentrated both in the temporal field and the frequency field.

14. Signal according to claim 3, characterized in that its complex envelope meets the following equation:

$$s(t) = \sum_{m+n \text{ even}} a_{m,n} x_{m,n}(t)$$

where:

$a_{m,n}$ is a real coefficient representing the source signal, chosen in a predetermined alphabet of modulation;
m is an integer representing the frequency dimension;
n is an integer representing the temporal dimension;
t represents time;
$x_{m,n}(t)$ is a basis function translated into the time-frequency space of one and the same even-parity function x(t) taking real or complex values, namely:

$$x_{m,n}(t)=e^{i\phi_{m,n}}e^{i(2\pi m v_0 \tau + \phi)}x(t-n\tau_0) \text{ with } v_0\tau_0=1/2$$

with $\phi_{m,n}=(m+n+mn+(n^2-m^2)/2)\pi/2$ where $\phi$ is an arbitrary phase parameter, and where said basic functions $\{x_{m,n}\}$ are mutually orthogonal, the real part of the scalar product of two different basic functions being zero.

15. Signal according to claim 6, characterized in that said prototype function x(t) is a function identical to its Fourier transform.

* * * * *

UNITED STATES PATENT AND TRADEMARK OFFICE
CERTIFICATE OF CORRECTION

PATENT NO. : 6,584,068 B1
DATED : June 24, 2003
INVENTOR(S) : Michel Alard

It is certified that error appears in the above-identified patent and that said Letters Patent is hereby corrected as shown below:

Column 11,
Line 45, delete "amen" and insert -- $a_{m,n}$ --

Column 14,
Line 11, after "transmitted" insert -- $a_{m,n}$ --

Column 15,
Line 6, delete "IRF" and insert -- RF --

Column 25,
Line 14, delete "LATTIES" and insert -- LATTICES --

Column 33,
Line 26, delete "time-frequency plane 4.3.2 Phase Shift Operator" and insert
-- time-frequency plane,
4.32. Phase Shift Operator --

Column 42,
Line 37, delete "aennea" and insert -- defined --

Column 44,
Lines 4 and 19, delete " $\vec{e}$ " and insert -- $\vec{s}$ --
Line 43, delete "amen" and insert -- $a_{m,n}$ --

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,584,068 B1  Page 1 of 1
APPLICATION NO. : 09/297787
DATED : June 24, 2003
INVENTOR(S) : Michel Alard It is certified that error appears in the above-identified patent and that said Letters Patent is hereby corrected as shown below:

Column 46, Line 54, delete "1/2" and insert --1/4--

Column 47, Line 30, delete "1/2" and insert --1/4--

Column 9, Line 29, delete "1/2" and insert --1/4--

Column 12, Line 48, delete "1/2" and insert --1/4--

Signed and Sealed this

Twenty-sixth Day of August, 2008

JON W. DUDAS
*Director of the United States Patent and Trademark Office*